United States Patent [19]

Clairmont et al.

[11] Patent Number: 5,289,215
[45] Date of Patent: Feb. 22, 1994

[54] VARIABLE-POSITION LENS-MOUNTING ACCESSORY FOR MOTION-PICTURE CAMERAS, AND METHOD OF USE

[75] Inventors: Denny Clairmont, North Hollywood; Kenneth W. Robings, Santa Monica, both of Calif.

[73] Assignee: Clairmont Camera Incorporated, Studio City, Calif.

[21] Appl. No.: 816,862

[22] Filed: Jan. 2, 1992

[51] Int. Cl.⁵ .................... G03B 17/00; G03B 21/00
[52] U.S. Cl. ............................. 352/243; 352/48; 352/53; 352/85; 352/139; 352/140; 354/160; 354/189; 354/286
[58] Field of Search .................. 352/243, 48, 53, 85, 352/139, 140; 354/81, 160, 177, 189, 286, 295

[56] References Cited

U.S. PATENT DOCUMENTS

| | | | |
|---|---|---|---|
| 2,148,508 | 2/1939 | Seitz | 352/243 |
| 2,729,154 | 1/1956 | De Grave et al. | 352/243 |
| 3,589,260 | 6/1971 | Ferra | 352/243 |
| 3,825,938 | 7/1974 | Koch | 354/160 |
| 4,763,147 | 8/1988 | Vogt | 354/160 |
| 4,771,302 | 9/1988 | Hamada et al. | 354/189 |
| 4,814,803 | 3/1989 | Wisner | 354/189 |
| 5,027,143 | 6/1991 | Clark et al. | 354/160 |

*Primary Examiner*—Monroe H. Hayes
*Attorney, Agent, or Firm*—Ashen & Lippman

[57] ABSTRACT

The device permits swing, shift, tilt and rise-and-fall movements between a lens and a motion-picture camera to manipulate focal relations and image shapes. Preferably the device rests on rails (called "iris rods") of a balance plate or base—secured under the camera—or some other track, similarly mounted. If so, the device has a first intermediary element preferably mounted to slide fore-and-aft on the track relative to the camera; and other intermediary elements mounted in a sequence preferably from the first element for translation and rotation relative to that element—ending in a lens-board mount for mounting a lens. Also in balance-plate mounting the device preferably includes a bellows whose front end joins the lens-board mount and whose rear end holds an adapter to engage the camera lens port. Preferably the device has a yoke (preferably flat and rearward-extending) for, e.g., swings to avoid interference with a central lower mirror housing of one camera popular with cinematographers, and is relatively narrow on at least its right side to clear the mirror housing of another such camera, and is reduced in height at one side to clear the viewfinder (and mirror housing) on yet another. Methods of use include rotating or translating the lens while filming, and even while panning or tilting the camera.

13 Claims, 12 Drawing Sheets

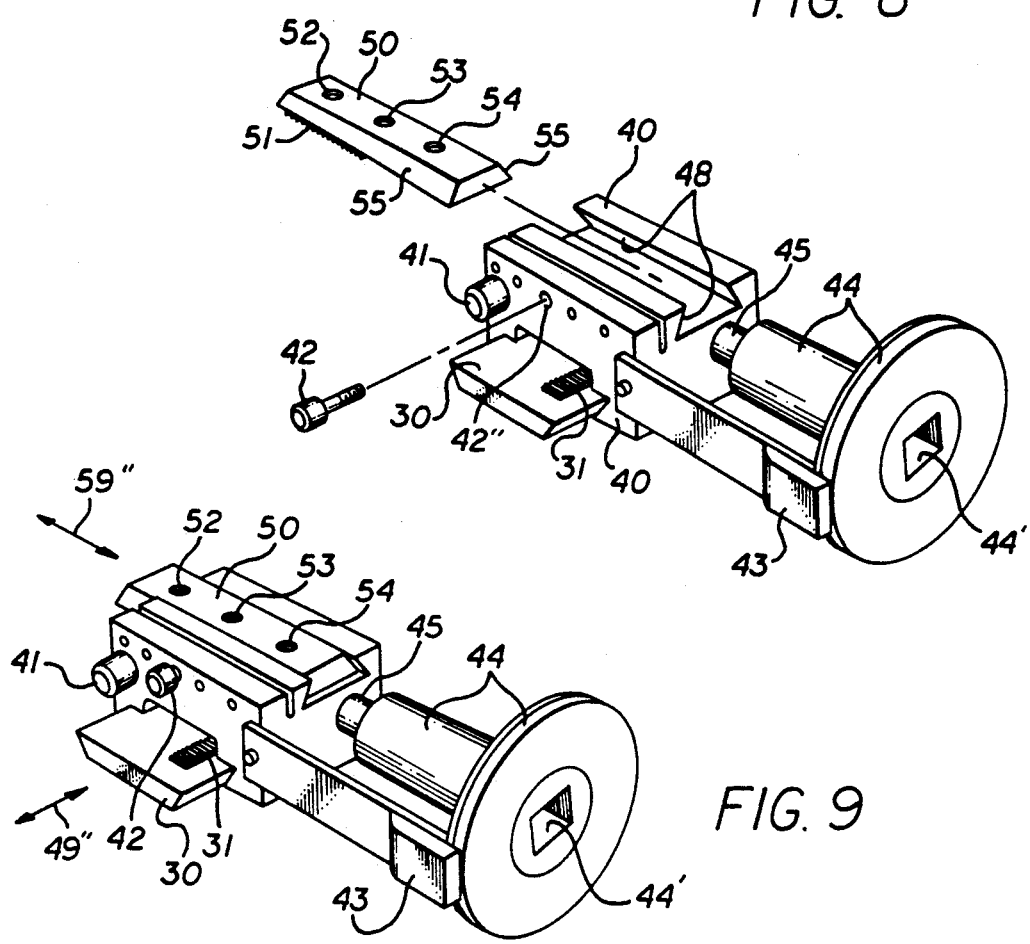
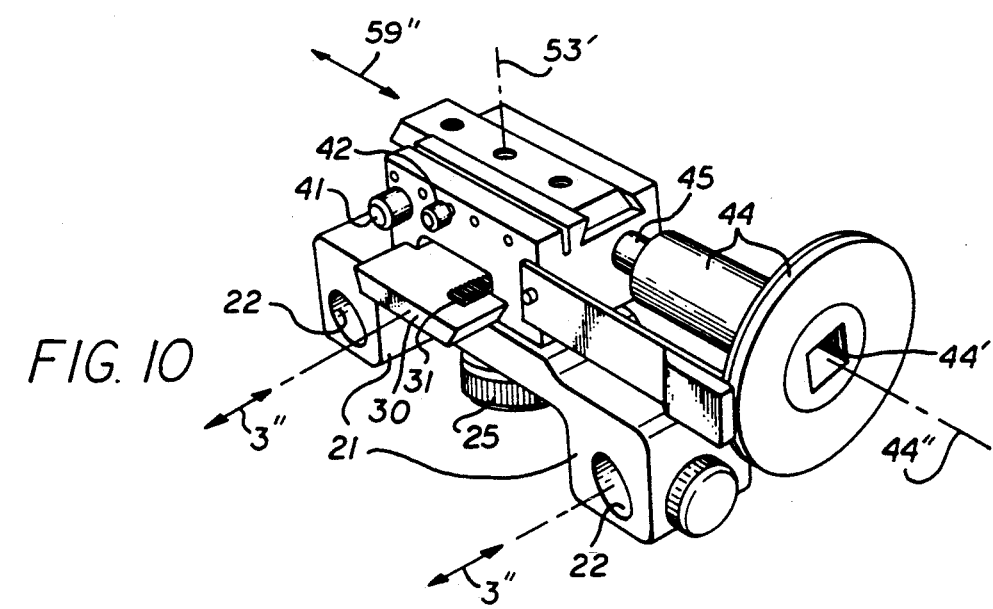

FIG. 19
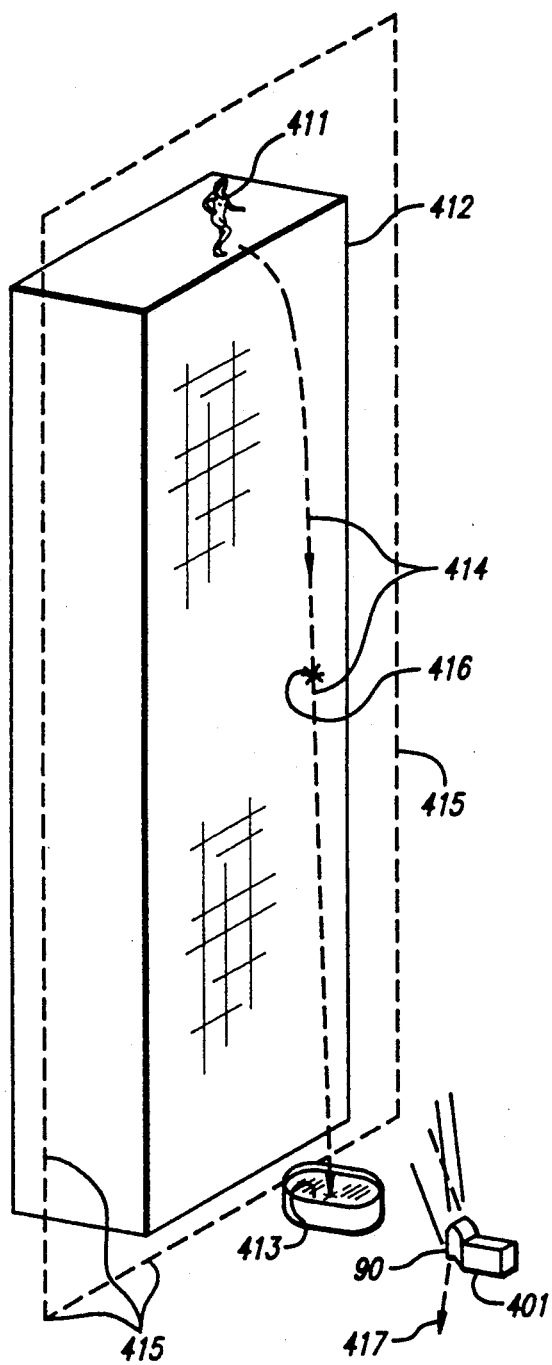
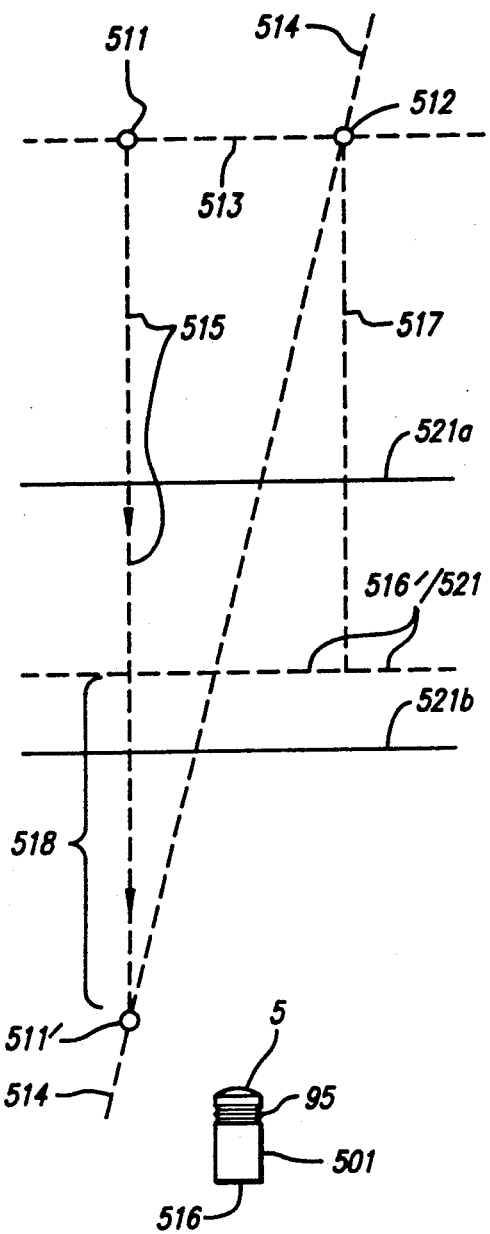
FIG. 20

VARIABLE-POSITION LENS-MOUNTING ACCESSORY FOR MOTION-PICTURE CAMERAS, AND METHOD OF USE

BACKGROUND

1. Field of the Invention

This invention relates generally to professional cinematography; and more particularly to accessory apparatus for use with existing, standard professional motion-picture cameras, and to methods for cinematographic photography.

2. Prior Art

In still photography, as distinguished from motion-picture work, professionals commonly use view cameras that are equipped with adjustments for disposing and orienting a lens variably or selectably in relation to the film plane. Such adjustability is particularly useful, as is well known, for manipulating focal relations and image shapes.

Still photographers know that rotating the film plane relative to an object—for example, relative to the frontal plane of a building being photographed—alters the shape of the object image at the film. This effect is most commonly recognized in photography of geometrically regular objects such as rectangular tall buildings.

(Throughout this discussion, except where otherwise specified, we are referring to rotation of the film plane about an axis that is in a plane which is preferably parallel or nearly parallel to the film plane—or at least about some axis that is not perpendicular to the film plane. Rotation about an axis perpendicular to the film plane does have some utility as we shall describe shortly, but does not in itself alter either focal relationships or image shapes.)

The shape-alteration effect, however, is also present in photography of nonplanar or irregular articles. Thus eggs can be imaged to appear spherical, and billiard balls egg-shaped.

Perhaps somewhat less generally recognized is the fact that rotating the lens plane relative to an object, or relative to the film plane, alters the focus. More specifically, planes of constant focus in the object space (and the corresponding planes in the image space) rotate with the lens plane.

For example, the photographer Ansel Adams used the focal-alteration effect in a classic picture of Mount Williamson. The image includes a mountain range a mile or two away, and in front of it a boulder-strewn plain—the nearest rocks just a few feet away. Both the mountain and the nearest rocks are in sharp focus, a result apparently obtained in part by tilting the lens down to change the plane of sharp focus from vertical to more nearly parallel with the field of boulders.

Creative use of both the shape and focal alterations often produces in the film plane an image of the desired subject that is off center relative to—or even entirely outside of—the photographable frame. Compensation for this undesired result requires transverse motion of the film frame relative to the lens or, to put it more generally, transverse relative motion between the film frame and lens. (Because lenses are most often smaller than cameras, such relative motion is usually described as shifting the lens relative to the camera.)

Such transverse motion in effect displaces the film frame within, but parallel to, the focal plane so as to select for recording within the limited film frame some relatively small part of the focused image. That part need not be near the lens axis or centerline.

In professional view cameras, rotational adjustments of the lens relative to the film plane are provided in two components: rotation about a vertical axis, which is usually denominated "swing"; and rotation about a horizontal axis, usually called "tilt". Similarly, translational adjustments are provided in two components: "shift" or horizontal translation, and "rise-and-fall" or vertical translation.

All these adjustments are usually provided by supporting a lens-board mount as the final element in a sequence of intermediary mechanical elements between the camera and the lens board. Each intermediary element is supported from an earlier element in such a way as to supply one of the translational or rotational movements desired.

View cameras generally have a single, unitary rail for mutual support and longitudinal adjustment (i.e., focus) of the film back and lens board. In some view cameras the first stage or element of the lens-board carriage can be simply slid along the rail and manually clamped at a desired position, and fine adjustment (fine focus) can then be attained by longitudinal rack-and-pinion adjustment of the next element of the lens-board carriage relative to that first sliding element; but in other cameras the first stage itself has a rotatable pinion that engages a long, toothed rack extended along the rail. In all these situations, as will be understood for purposes of this document, each later stage is to be considered as sliding (or moving) relative to its immediately earlier stage—subject to gear means, if present, interconnecting the elements to provide relatively fine manual control of the motion.

In some press-style cameras a pair of outboard rails is substituted for the single, unitary rail. These cameras, however, generally have a much more limited selection and range of different lens/film movements.

The sequence of intermediary mechanical elements continues from the first stage, or first two stages, that supply focal adjustment through other elements supplying swing, tilt, shift and rise-and-fall, to the lens-board mount. A bellows between the lens-board mount and a port on the camera back then seals the optical path against ambient light, so that only image light from the lens can reach the film. This system is desirable in that the bellows accommodates the many possible combinations of swing, tilt, shift and rise-and-fall between the lens and film while maintaining a good light seal.

In recent years, however, a different system has been introduced in accessories for still cameras of the single-lens reflex (SLR) type. In these accessories there is no bellows, and instead a series of intermediary elements is supported from the lens-mounting port of the SLR camera, where a lens is usually placed.

A lens is then mounted to the last of the intermediary elements in the sequence. Light from the lens passes through all or most of the intermediary mechanical elements, and through the lens-mounting port to the film. Substantially all of the movements between successive intermediary elements in such systems, accordingly, must be individually light-sealed.

In some SLR systems the objectionable requirement of individual light seals between all the intermediary mechanical elements or stages is mitigated simply by reducing the number of stages. This can be done simply by foregoing, for example, horizontal movements (swing and shift); and these movements are much less commonly desired than the vertical adjustments (tilt and rise-and-fall). Furthermore, setting aside the limitations of the high-aspect-ratio image format in SLRs, the vertical movements can be substituted for the horizontal ones simply by rotating the camera about the lens axis.

Another approach used in SLR systems, however, is to provide another sort of movement between stages—namely, rotation of the accessory, or some of its stages, about the lens axis. This particular motion is relatively very easy to light-seal, and so adds relatively little complexity or difficulty to the mechanism, but can be used to very effectively convert the vertical movements into horizontal movements.

This approach also has another beneficial result that goes beyond merely reducing the number of difficult optical seals: with this system, focal or geometrical alterations can be effectuated with respect to axes that are neither vertical nor horizontal—and therefore without the necessity for combining separate vertical and horizontal effects to obtain the desired results. This advantage, however, comes into play only in quite unusual situations.

As far as we know, no one has ever provided an accessory for standard motion-picture cameras to supply generally adjustable rotational or translational relative motion of the lens and film.

Perhaps some such accessories have been used in special-effects work with models, such as shots intended to simulate the appearance of enormous spacecraft passing by—in which lens swings may have been coordinated with changes in model position and camera angle to generate exaggerated vanishing-point effects. These, however, are in essence still-camera applications.

We are aware of isolated instances in which individual cinematographers—confronted with a desire to correct (or create) a geometrical or focal distortion, or to use some portion of an image that would normally be outside the film frame—have custom-mounted a lens in an odd position or orientation. Each such customized arrangement has been for purposes of a particular shot, and generally has been set up by using very temporary special mounting provisions—such as supporting part of the lens board in putty, and very carefully moving the lens into a desired position to be maintained by the putty.

As will be evident, such arrangements require special light-sealing provision or other undue effort. They are not amenable to dynamic shots in which the motion-picture camera is mounted on a moving vehicle, pendulum, sling or other carriage—and so cannot be used as a matter of routine.

We are not aware of anyone else having previously considered the possibility of making an attachment for motion-picture cameras to facilitate such routine operation. If such thought has been devoted to this problem, very likely it has been abandoned upon consideration of the difficulties of accommodating the specific geometries of modern cameras that are popular with cinematographic professionals.

As we are not aware of any prior thought having been devoted to this problem, it would be inappropriate to further speculate on specific geometry difficulties under the heading of "prior art." Because our own work that led to the present invention has included very extensive analysis of these problems, we shall discuss them further in the next section—which is devoted to our invention.

Accordingly a problem has existed heretofore in the cinema field—namely, that professional motion-picture-camera operators have not been able to make routine advantage of the composition, image-correction or -distortion, or focal alterations available through swing, shift, tilt or rise-and-fall of a lens relative to a motion-picture camera. Such advantage would include straightforward solutions to a great variety of problems routinely faced in cinematography.

As a simple example, it is common in making motion pictures to photograph two or more people who are at greatly different distances from the camera. To obtain the needed depth of focus without resorting to focal alteration as Adams did in his photograph of Mount Williamson, it is common to lengthen the depth of focus by stopping down the lens to an extreme degree.

This in turn, however, requires a correspondingly extreme overillumination of the scene, resulting in actors' discomfort and relatively unnatural expressions, as well as fatigue. In motion-picture work generally, time exposures are not an option to compensate for the use of very small apertures.

Other possibilities, such as using shorter-focal-length lenses (which exaggerate the size of nearer objects) or faster film (that generally introduces differences of color balance and grain size), each have their own respective drawbacks. Fundamentally, they restrict esthetic control by the director and camera operator.

Other aspects of the existing problem in cinematography include exaggerated vanishing-point effects when photographing tall buildings or horizontally long objects such as railroad trains. These too can be objectionable, and virtually impossible to avoid—especially when panning upward or sideward, respectively.

Still other aspects of the problem arise in use of such favorite dramatic effects as photographing a scene in a mirror. To obtain a very close simulation of the geometric relationships seen by a person who is looking directly into a mirror, it is particularly desirable to be able to point the camera directly toward the mirror, along a perpendicular to the mirror surface.

As this condition is approached, however, of course the cinematographer finds an image of the camera—or of the camera operator—intruding into the scene. To avoid that unacceptable result, the camera must be pointed at a different angle and the feeling of intimacy and realism in the scene thus sacrificed. No such compromise is required when the lens can be shifted laterally relative to the film frame.

From all the foregoing it can be appreciated that the prior art has not solved this problem of providing a generally usable swing/shift/tilt/rise-and-fall accessory for motion-picture use.

In a known area of cinematography not heretofore associated with this problem, photographers have used a hardware accessory called a "balance plate" or "base" for mounting optical accessories such as matte boxes, or to help support very long, heavy lenses. The balance plate is relatively shallow and is mounted below the motion-picture camera—usually between tripod and camera.

It carries a pair of forward-extending cylindrical bars historically known as "iris rods". Usually a bridge structure, mounted to slide along and clamp to the iris rods, supports the optical accessory or long lens.

SUMMARY OF THE DISCLOSURE

We have realized that a lens-adjusting accessory would cure the cinematographic problems discussed above. We encountered severe obstacles, however, to constructing a lens-adjustment accessory that could actually have economic feasibility and practical utility in motion-picture work.

We devoted very extensive effort to overcoming those problems. They arose from the difficulties of accommodating the geometries of modern cameras that are popular with cinematographic professionals.

The strong motivation in modern cinematography to avoid wasting light has militated very strongly against cameras that use half-silvered mirrors to divert light to the viewfinder. Preferred cameras therefore use mirror/choppers that time-share the light from the scene, illuminating the viewfinder only while the film strip is in motion to change frames.

The resulting geometries of mirror/choppers and viewfinders all entail forward protrusion of these modules from the respective camera bodies. More specifically, these modules protrude forward beyond the lens-mounting ports.

To avoid having to mount the lens greatly forward from the usual lens-mounting port, it is very desirable that any swing, tilt, shift or rise-and-fall movements occur very close to the lens-mounting port. Such movements however, if restricted to the region very close to that port, are very likely to encounter interference from the mirror/chopper or viewfinder module protruding forward near that same port. This is particularly problematic at extremes of swing/shift movement, such as for example an extreme shift in one direction combined with extreme swing in the same direction.

To some small extent these effects can be circumvented by using a relatively long-focal-length lens, because such a lens can be mounted further forward from the film plane. This escape from the space limitations imposed by forward-extending modules, however, is extremely constrained—because of the flat, telephoto-like appearance of resulting images. Such images suffer from loss of intimacy or presence, especially as the camera moves in relation to the scene, or as the people or other objects in the scene move in relation to the camera.

Consequently a basic requirement for a usable swing/shift accessory for a cinema camera is that the accessory accommodate the forward-protruding modules found on the camera.

Upon studying the several cinematographic cameras that are professionally popular and that predominate in professional work, we encountered another obstacle to development of an accessory for these cameras: the various forward-protruding modules are in different positions on different cameras. To manufacture and inventory a separate accessory for each different camera, however, would be relatively uneconomic.

Therefore it is very highly desirable to provide a single accessory that can be used with most of the popular camera models. As can now be appreciated, the varied positions of the several protruding modules severely complicates the task of developing a commercially viable swing/shift accessory for modern motion-picture cameras.

Our invention solves all the problems discussed above—namely, the inability of cinematographers to take routine advantage of composition, image-correction or -distortion, or focal alterations. Thus our invention makes it possible to photograph two or more people at greatly different distances from the camera, without stopping down to high f/ numbers or the associated overillumination, and without the distortions of short-focus lenses or the image drawbacks of fast film.

Similarly our invention makes it possible to eliminate exaggerated vanishing-point effects (or to introduce them easily when desired), and facilitates dramatic mirror shots—as well as other artistic devices that involve conflicts between desired camera position and desired camera angle. For example, a desired camera angle can be substantially maintained while displacing the camera enough to effectively avoid a fixed visual obstacle (such as a foreground telephone pole).

Our invention has several major aspects, which we prefer to incorporate into one device and method for maximum enjoyment of all potential benefits of the invention. The several aspects, however, are susceptible to separate practice, and so are presented separately in certain of the appended claims.

For this reason we shall discuss several of the aspects of our invention independently in this section.

In a first of its major aspects, our invention is a variable-position lens-mounting accessory for use with a motion-picture camera that has a camera body and a lens-mounting port on the camera body, and that defines a film plane for exposure of motion-picture film. The invention is also for use with generally fore-and-aft support-rail means secured to the camera body; and with a photographic lens.

By the phrase "support-rail means" we mean to encompass any of a variety of rail configurations that act as means for supporting certain elements (mentioned below) of our accessory. For instance, the support-rail means might be a single unitary rail, either with or without an associated geared rack, as used in prior still cameras; or might take other forms such as those illustrated and described in this document.

In this first major aspect, the accessory of our invention comprises a first intermediary element that is slidably mounted substantially directly to the support-rail means for fore-and-aft sliding motion along the rail means. The accessory also includes manually operable means for locking the first element to the rail means, when desired to prevent sliding of the first element along the rail means.

The accessory according to this first major aspect of our invention also includes a plurality of additional intermediary elements. These are mounted from the first element in a sequence, to provide a plurality of translational and rotational components of motion relative to the first element. The plurality of additional intermediary elements also includes, as a last element of the sequence, a lens-board mount for mounting the photographic lens.

Also included in our accessory, as seen its first major aspect still under discussion, is a bellows. The bellows has a front end that is secured substantially directly to the lens-board mount, and a rear end.

Finally in this first major aspect our accessory includes an adapter secured substantially directly to the rear end of the bellows. The adapter is engageable with the lens-mounting port of the motion-picture camera.

As a result of all these structures and their interrelations, the lens—when in use—is disposed and oriented in a selectable manner relative to the film plane.

The foregoing may be a description or definition of the first major aspect of our invention in its broadest or most general form. As will be seen, however, we prefer to practice each major aspect of our invention together with several other features or characteristics (and in conjunction with the other aspects of the invention, as mentioned earlier), in order to optimize the advantages of our invention.

In a second major aspect, our invention is closely related to the first aspect—with certain significant differences. First, the body of the camera with which the accessory is to be used includes at least one forward-protruding portion or module, and a lens-mounting port which is recessed on the camera body rearward from the forward-protruding portion.

It will be noted that the camera is not itself a part of the invention itself, in either the first or second major aspect, but rather is part of the environment in which the invention exists and functions. Hence these differences being discussed are differences in the environment of the invention.

Second, the bellows and adapter, when in use, extend rearward from the lens-board mount, and rearward of the forward-protruding portion, to engage the recessed lens-mounting port.

Third, here the accessory does not necessarily include manually operable means for locking the first element to the rail means. The second and third points just mentioned are actually differences in the invention itself.

A third major aspect of our invention is also closely related to the first, but with certain significant differences. Here the support-rail means with which the invention is to be used are in the form of a pair of generally fore-and-aft support rails mounted to the camera body. It will be noted that the support-rail means too are part of the environment for both the first and third aspects of our invention; hence this difference is a difference in environment.

The first intermediary element accordingly is slidably mounted substantially directly to the support rails for fore-and-aft sliding motion along the rails. The manually operable locking means lock the first element to the rails, when desired to prevent sliding of the first element along the rails.

In a fourth major aspect, our invention is a variable-position lens-mounting accessory for use with any one of three or more standard motion-picture cameras selectably. Each of the three or more cameras has a camera body and a lens-mounting port on the camera body, and each of the cameras defines a film plane for exposure of motion-picture film.

A first one of the cameras has a generally central first module that protrudes forward from a lower portion of the camera body. A second one of the cameras has a module protruding forward along a right side of the camera body; we shall call this module on the second camera a "second module", merely to distinguish it from the forward-protruding module on the first camera.

A third one of the cameras has a third module protruding forward from an upper left corner of the camera body. Again merely to distinguish this module from those on the first and third cameras we shall call this one the "third module". (This third camera has in addition a protruding lower central module similar to the first module on the first camera.)

This aspect of our invention is also for use with generally fore-and-aft support-rail means (as defined earlier) secured to the camera body; and for use with a photo lens.

In this fourth major aspect of our invention, the accessory includes a first intermediary element slidably mounted substantially directly to the support-rail means for fore-and-aft sliding motion along the rail means. This accessory also includes manually operable means for locking the first element to the rail means, when desired to prevent sliding of the first element along the rail means.

This accessory also includes another intermediary element. This "other" intermediary element includes a very generally rectangular frame, which in turn includes several components.

The frame includes a lower member that is shaped as a very generally flat yoke. The yoke has (a) a central portion, surrounding the above-mentioned rotational axis and extending sideward from the axis, and (b) outboard portions that extend rearward from the central portion.

The frame also includes generally vertical members extending upward from outboard ends of the outboard portions.

The frame further includes an upper member that is very generally horizontal. The upper member interconnects upper ends of the generally vertical members to form with them the top of the frame.

When the accessory is used with the first camera certain special relationships obtain: the top of the frame (made up of the vertical and upper members) is suspended by the yoke-shaped lower member, and rotates, very generally above the central first module of the first camera. That is to say, the top of the frame both (a) is suspended above the first module and (b) rotates above the first module. As a result, when the accessory is used with the first camera, the lower member during rotation, by virtue of the yoke shape, does not interfere with the central lower module of the first camera.

Additional relationships obtain when the accessory is used with the second camera: the frame is sufficiently narrow, at least on its right side, to clear the second module of the second camera, at least when that second intermediary element is disposed generally near its central position. (In practice we have been able to configure our accessory so that it clears even when the second intermediary element is disposed far to the right of its central position.)

Further relations obtain when the accessory is used with the third camera: the upper member defines a dip at one side to clear the third module on the third camera. (Meanwhile the frame and yoke clear the protruding lower central module of this third camera, just as already described for the first module on the first camera.)

The fourth major aspect of the invention also includes a plurality of additional intermediary elements, mounted in a sequence from the "other" element discussed just above. These additional elements provide a plurality of translational or rotational components of motion relative to the first element; and they include as a last element of the sequence a lens-board mount for mounting the photographic lens.

In its fourth major aspect our invention also includes a bellows having a front end that is secured substantially directly to the lens-board mount, and a rear end; and includes an adapter secured substantially directly to the rear end of the bellows. This adapter is engageable with the lens-mounting port of the motion-picture camera.

In consequence of these various structures and interrelations, the lens when in use is disposed and oriented in a selectable manner relative to the film plane.

A fifth major aspect of our invention is closely related to the fourth aspect, but here we shall identify the "other" intermediary element as a third intermediary element, because in this fourth aspect of our invention an added intermediary element is interposed between the "first" and "other" elements discussed previously. We shall accordingly refer to the interposed element as a second intermediary element.

This second intermediary element is supported from the first intermediary element for generally lateral motion, from a central position, relative to the first intermediary element. The third intermediary element is mounted substantially directly to the second intermediary element, for rotation about a generally vertical axis relative to the second intermediary element.

A sixth major aspect of our invention is closely related to the fifth. Here the primary difference is that the three forward-protruding modules of the three cameras are specifically identified as, respectively: (1) on the first camera, a generally central mirror housing that protrudes forward from a lower portion of the camera body, (2) on the second camera a mirror housing protruding forward along a right side of the camera body, and (3) on the third camera, a viewfinder protruding forward from an upper portion of the camera body.

Thus as in some of the major aspects already discussed, one difference between the fifth and sixth aspects of the invention is largely one of environment. Another difference is that the sixth aspect includes manually operable focal controls at the left side of the accessory for controlling the fore-and-aft motion of the first intermediary element.

A seventh major aspect of our invention is related to the sixth aspect, in that modules of the three cameras are identified specifically as mirror housings and viewfinders, and is also related to some of the aspects discussed previously. As will be seen, however, certain features of the invention itself are expressed in more general terms.

In this seventh major aspect, our invention includes a first intermediary element mounted for fore-and-aft motion, relative to the lens-mounting port, and manually operable focal controls at the left side of the accessory for controlling the fore-and-aft motion.

This aspect of the invention also includes at least one intermediary translational-motion element mounted for translational motion in a plane that is at least very generally parallel to the mounting-port plane. It also includes at least one intermediary rotational-motion element mounted for rotation about an axis which lies in a plane that is at least very generally parallel to the mounting-port plane. (These translational- and rotational-motion elements in a sense may be regarded as generalizations of the intermediary elements described for other aspects of our invention.)

Also included in this seventh aspect of our invention is a frame. (We use the term "frame" in its more general sense encompassing a skeletal structure, as well as a closed framework.) The frame is supported relative to the camera body, and supports at least some of the intermediary elements.

The frame includes at least one substantially linear member that extends alongside—but substantially not beneath—the lens when the lens is in use. The alongside extension is in a plane that is at least very generally parallel to the mounting-port plane.

When the accessory is used with the first camera, the substantially linear member during motion does not interfere with the central lower mirror housing of the first camera. This clearance is by virtue of the nonextension of the linear member beneath the lens in a plane at least very generally parallel to the mounting-port plane.

The frame is sufficiently narrow, at least on its right side, to clear the mirror housing of the second camera, at least when the second intermediary element is disposed generally near its central position. The frame is vertically relieved on at least one side to clear the viewfinder on the third camera (and, as with the first camera, the linear member also clears the lower central lower mirror housing).

Because of the structure and interrelationships just described, all of the intermediary elements operate substantially without interference with the first generally central lower mirror housing of the first camera, the mirror housing of the second camera, or the viewfinder (and mirror housing) of the third camera—when the accessory is used with the first, second or third camera respectively.

In its seventh aspect our invention also includes a lens-board mount, supported from all of the intermediary elements, for mounting the photographic lens. It further includes an adapter attached to one of the intermediary elements; the adapter is engageable with the lens-mounting port of the motion-picture camera.

The overall result is that the lens, when in use, is disposed and oriented in a selectable manner relative to the film plane.

An eighth major aspect of our invention is closely related to the seventh, but in addition is for use selectively with yet a fourth standard motion-picture camera. This camera has a mirror housing protruding forward along a right side of the camera body and also a viewfinder protruding forward from an upper portion of the camera body.

Correspondingly the accessory frame is sufficiently narrow, at least on its right side, to clear the mirror housing of the fourth camera; and the vertical relief of the frame also clears the viewfinder on the fourth camera.

By virtue of this configuration, all of the intermediary elements operate substantially without interference with the mirror housing and viewfinder of the fourth camera, when the accessory is used with the fourth camera—in addition to the noninterferences previously mentioned in use with the first, second or third cameras.

In all eight of the major aspects of our invention introduced so far, as will be recalled, several features have been described as parts of the context or environment of the invention—not as parts of the invention itself. In particular, we have said that the accessory is for use with certain cameras, the cameras having bodies, ports, and film planes, and in some instances specified protruding modules; and is for use with support-rails or support-rail means, and for use with lenses.

In the first eight major aspects, the cameras, bodies, ports, film planes, modules, rails and lenses thus are parts of the environment in which our invention exists and operates.

To more particularly and specifically indicate where these features are not parts of the invention itself, we have used in certain of the appended claims a nomenclature that clearly emphasizes their status as parts of the environment: in referring to these features within the bodies of the claims, we have used the word "such" rather than "the" or "said". For example, we refer to "such film plane", "such lens", etc. This contrasts with phrases "the first element", "the yoke" etc. used for features of the invention itself.

In a ninth major aspect of our invention, however, all these features are parts of the claimed combination. Thus the invention in its ninth major aspect is the combination of four constituent parts enumerated below.

The first constituent is a motion-picture camera that has a camera body including at least one forward-protruding portion and a lens-mounting port. The lens-mounting port is recessed on the camera body rearward from the forward-protruding portions, and defines a film plane for exposure of motion-picture film.

The second constituent of this ninth major aspect of our invention is a pair of generally fore-and-aft support rails mounted to the camera body. The third constituent is a variable-position lens-mounting accessory that includes:

- a first intermediary element slidably mounted substantially directly to the support rails for fore-and-aft sliding motion along the rails,
- a plurality of additional intermediary elements, mounted in a sequence from the first element to provide a plurality of translational and rotational components of motion relative to the first element, and including as a last element of the sequence a lens-board mount for mounting a photographic lens,
- a bellows having a front end secured substantially directly to the lens-board mount, and a rear end, and
- an adapter secured substantially directly to the rear end of the bellows, this adapter being engageable with the lens-mounting port of the motion-picture camera.

The bellows and adapter extend rearward from the lens-board mount, and rearward of the forward-protruding portion, to engage the recessed lens-mounting port.

The fourth constituent of this ninth aspect of our invention is a photographic lens that is mounted to the lens board. By virtue of all the structure and relationships just set forth, the lens is disposed and oriented in a selectable manner relative to the film plane.

The nine major aspects of our invention discussed to this point are all apparatus aspects. As mentioned earlier, we prefer to practice our invention in these aspects with added features or characteristics that enhance enjoyment of the full benefits of the invention.

For example, translational components of motion preferably include both generally vertical and generally lateral components of displacement. Rotational components preferably include rotation about generally vertical and generally lateral axes. Rotational components preferably include rotation about generally fore-and-aft axes too, since as previously mentioned such rotation about, essentially, the optical axis facilitates focal and geometric alterations along axes arbitrarily chosen rather than only vertical and lateral.

As another example, we prefer to include manually operable gear means interconnecting certain pairs of the intermediary elements—usually elements that are adjacent in the sequence. These gear means provide relative fine manual control of the relative motion of the pair of elements.

We also prefer that the first intermediary element be configured simply for sliding fore-and-aft along the rail means to provide coarse focus. We also prefer that an additional intermediary element be mounted substantially directly to the first intermediary element, also for generally fore-and-aft motion, to provide fine focus.

A tenth major aspect of our invention is a method of photographing a motion-picture scene with live action. By the phrase "live action" we mean to encompass not only scenes showing live actors—whether human or otherwise—but also scenes showing continuous movements that are filmed substantially continuously while the movements occur, as for example actual vehicles or other movable actual objects that are actually moving while filmed. Live action encompasses filming stationary objects with a moving or zooming camera as well.

(By "live action" we therefore include, for purposes of this document, both slow-motion and accelerated-motion shooting in which actual or apparent motion of objects in the scene generally continues during filming. We exclude stop-action shooting in which objects are moved from place to place between exposure of successive film frames, and are substantially stationary during exposure of each frame.)

This method includes the steps of:

interposing between a motion-picture-camera film plane and a photographic lens an accessory that facilitates disposing and orienting the lens in a selectable manner relative to the film plane;

then adjusting the accessory to select an initial disposition and orientation of the lens, relative to the film plane, for the scene;

then filming motion-picture footage of the scene, including continuous movements of the live action; and during the filming step, changing the disposition or orientation, or both, of the lens relative to the film plane.

We mean it to be understood, particularly with respect to this tenth major aspect of our invention, that the terms "disposition" and "orientation" do not refer to mere focusing. Simultaneous focusing can be either added or omitted without removing a method from the scope of the tenth aspect of our invention as just described.

The foregoing may be a description or definition of the tenth major aspect of our invention in its broadest or most general form. As will be appreciated from our earlier discussion of preferred forms of the apparatus aspects of our invention, however, we prefer to practice the method aspects too with certain added limitations or characteristics, to maximize enjoyment of its full benefits.

Thus for example we prefer to include in our method some steps that would be even more difficult, if not impossible, without our invention. Accordingly our invention preferably includes the additional step of panning or tilting the camera in relation to the scene: this additional step is performed during the filming step. In this preferred form of the invention, the disposition- or orientation-changing step occurs during the panning or tilting step.

As will now be clear, our invention in its various aspects and forms solves the problem set forth in the preceding section of this document, and does so simply and economically. Economy is particularly enhanced by the ability of our single accessory to accommodate several professionally popular standard cameras.

All of the foregoing operational principles and advantages of the present invention will be more fully appreciated upon consideration of the following detailed description, with reference to the appended drawings, of which:

BRIEF DESCRIPTION OF THE DRAWINGS

FIG. 8 is a like view of the fine-focus and shift stages, including the shift-stage upper member (a dovetail attachment, which also forms the lower member of the swing stage)—drawn displaced out of its operating track;

FIG. 9 is a like view with that same shift-stage upper member (and swing-stage lower member) shown in position;

FIG. 10 is a like view of the FIGS. 7 and 9 components assembled together;

FIG. 19 is a conceptual diagram representing progressive translational adjustment of the same embodiment during filming of live action; and FIGS. 20–22 are a like diagram showing progressive rotational adjustment of the same embodiment in filming of live action.

DETAILED DESCRIPTION OF THE PREFERRED EMBODIMENTS

Figure 1:
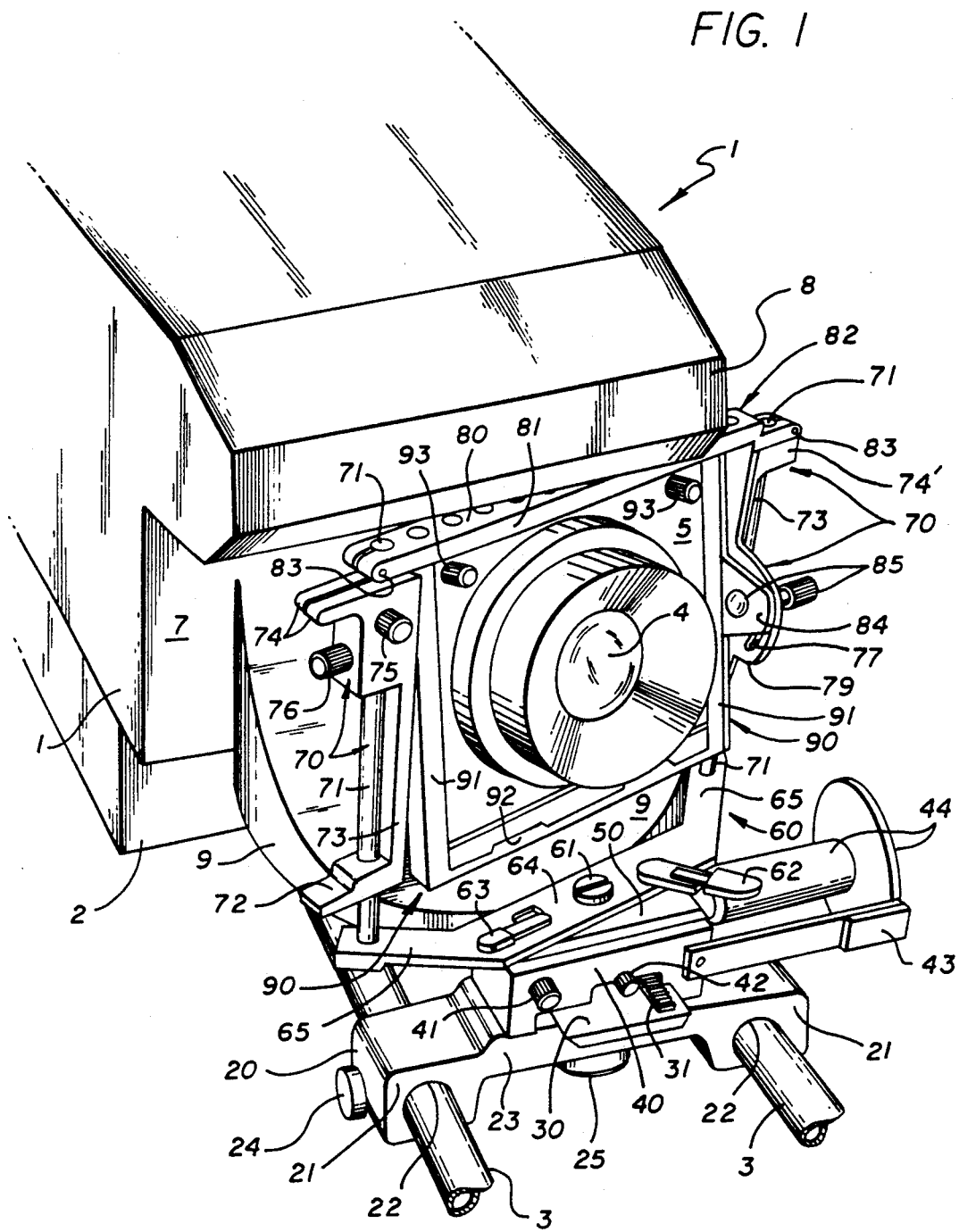
FIG. 1 is a perspective view of a preferred embodiment of our invention, as it appears at the front of a first type of motion-picture camera—and drawn with all the movement stages adjusted away from their on-center positions.
Figure 2:
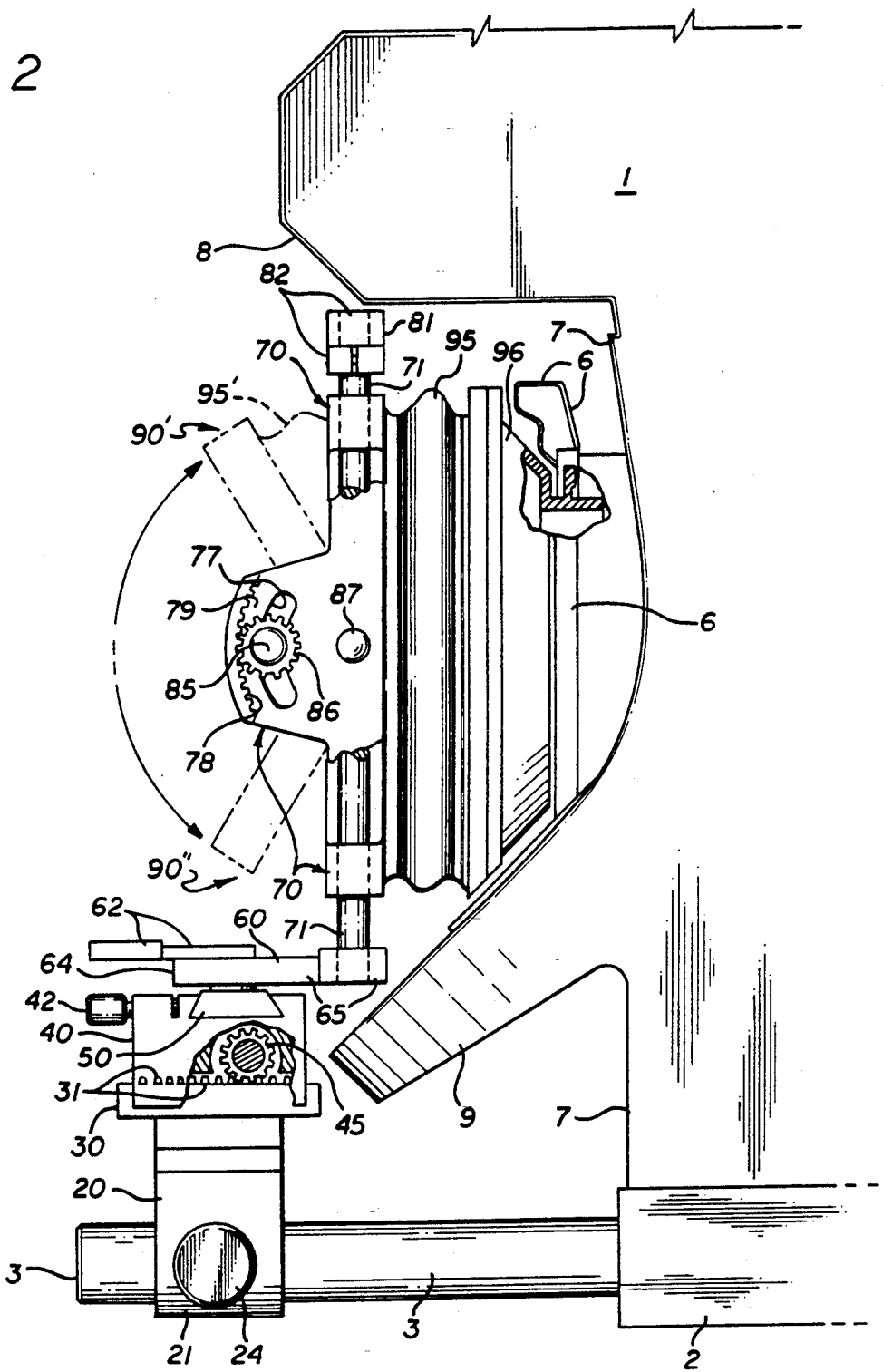
FIG. 2 is a left-side (from the camera operator's point of view) elevation of the same embodiment on the same type of camera, but with the several movement stages adjusted to their on-center positions—forward and rearward tilt angles of the lens board being represented in the phantom line; and portions of the apparatus being drawn broken away and in longitudinal section to show engagement of the accessory lens-port adapter with the lens-mounting port of the camera, and to show rack-and-pinion detail employed for fine focus.
Figure 2A:
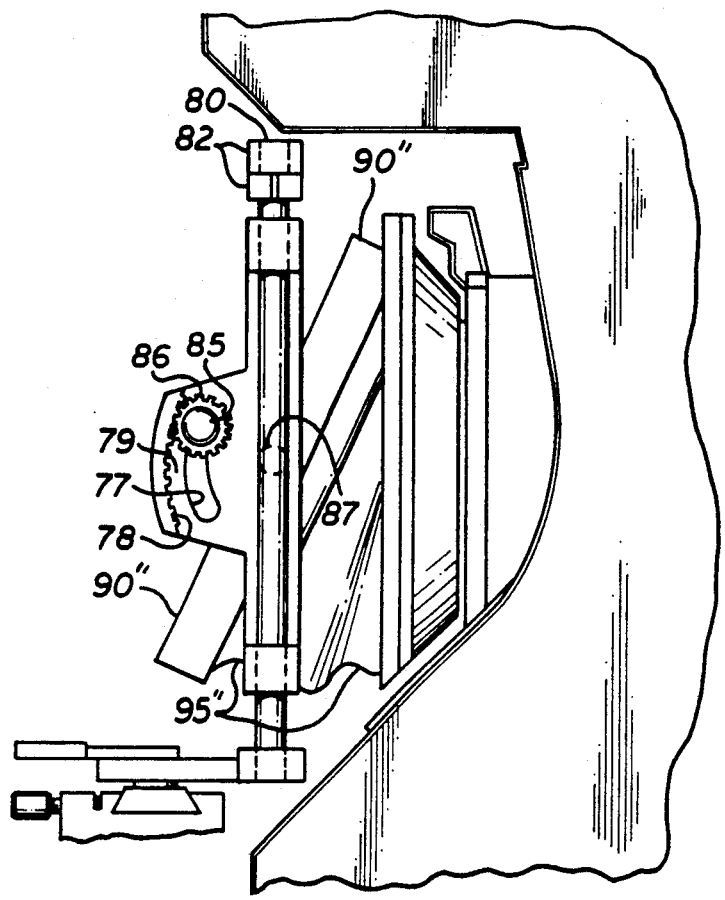
FIGS. 2A and 2B are like elevations (but without the phantom-line and broken-away portions) showing the same embodiment in full upward and full downward tilt conditions.
Figure 2B:
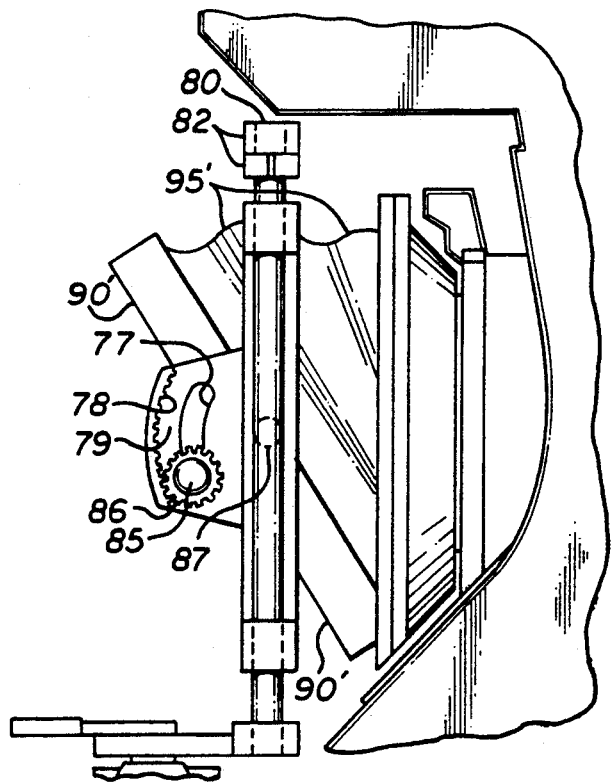

As shown in FIGS. 1 and 2, a first type of professional camera 1 that is particularly favored by cinematographers—and with which a preferred embodiment of our invention is particularly useful—is fitted with an accessory balance plate or base 2, from which protrude forward two circular bars called "iris rods" 3. Also in use are a lens 4 and its lens board 5: the lens 4 ordinarily would be mounted directly by a standard bayonet mount to a lens-mounting port 6 (FIG. 2) of the camera 1.

The camera 1 has a very generally vertical front face 7, viewfinder module 8 protruding forward along the top of the camera from the face 7. Also protruding forward, from generally the lower left-hand portion of the face 7, is an angled, generally circular-cylindrical housing module 9 that encloses a rotating internal mirror (not shown).

By the "left-hand" portion we mean the side that is at left as seen by an operator of the camera 1, looking forward from the rear of the camera; of course this at the right side of the illustration in FIG. 1. Because the housing module 9 occupies considerably more than half of the width of the face 7 of the camera, in most parts of this document we refer to the mirror housing module 9 more simply as a generally cylindrical "lower central" protrusion from the camera body.

The camera shape in FIG. 1 is very generally representative of the type of camera that uses an angled rotating circular-sector mirror to deflect incoming light from the lens 4 to the viewfinder 8 during film advance. Prominent among cameras of this type is the Arriflex model BL.

As FIGS. 1 and 2 show generally, the preferred embodiment of our accessory includes, mounted to the iris rods 3, a first transverse block 20. Fixed to the top of this block 20 is another component, which has the form of a dovetail 30.

The first transverse block 20 and the dovetail 30 actually function together as parts of a first intermediary element or stage 20/30. This first stage 20/30 in turn supports and guides the next element or stage—a fine-focus block 40 which rides fore-and-aft along the dovetail 30.

The fine-focus block 40 itself holds a lateral-shift dovetail 50, which in turn supports for swinging rotation (about a vertical pivot screw 61) a very generally vertical frame 60-70-80. The vertical components 70 of this swing frame include a pair of vertical rods 71, and sliding vertically along those rods the additional rise-and-fall elements or stage 72-73-74 at the right side of the camera (left side of FIG. 1) and 73-74' at the left.

Pivoted to this rise-and-fall stage 71-72-73-74-74' about a horizontal pivot 87 (FIG. 2) at each side of the frame 60-70-80 is a lens-board mount 90. The lens board 5, carrying the lens 4, simply slides into the mount 90 and is there secured in place by a pair of retaining screws 93 (FIG. 1).

Attached along the periphery of the lens-board mount 90 is the front end of a light-sealing bellows 95. Secured to the rear of the bellows 95 is a standard bayonet adapter 96, configured to engage the standard bayonet mount 6 of the lens-mounting port on the camera 1.

As will be familiar to those skilled in the field of cinematography, the lens-mounting port 6 is different on different cameras—and particularly on cameras that were made by different manufacturers. Accordingly in moving our accessory from one camera to another sometimes a different adapter 96 must be installed on the rear end of the bellows 95 of our accessory.

Figure 4:
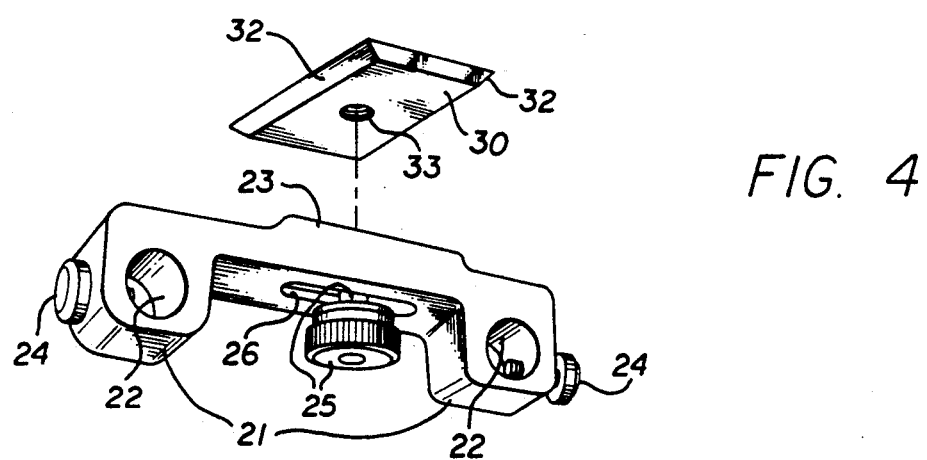
FIG. 4 is a bottom perspective view of the support-and-coarse-focus first stage of the same embodiment, together with a lower dovetail attachment—part of the fine-focus stage.
Figure 5:
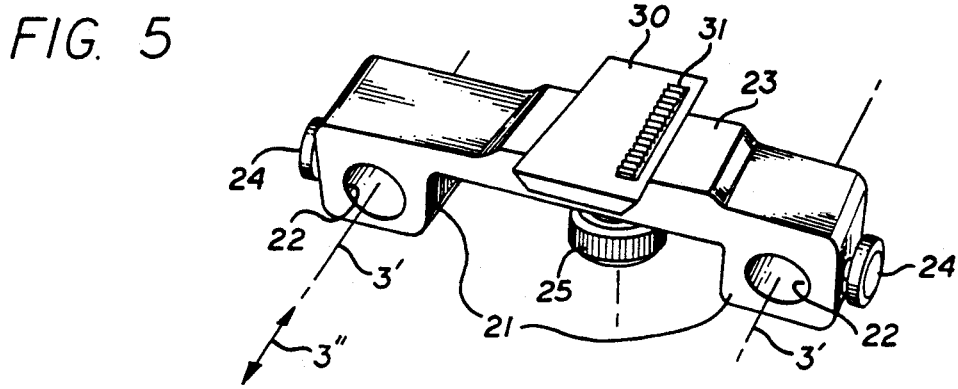
FIG. 5 is a top perspective view of the FIG. 4 components.
Figure 6:
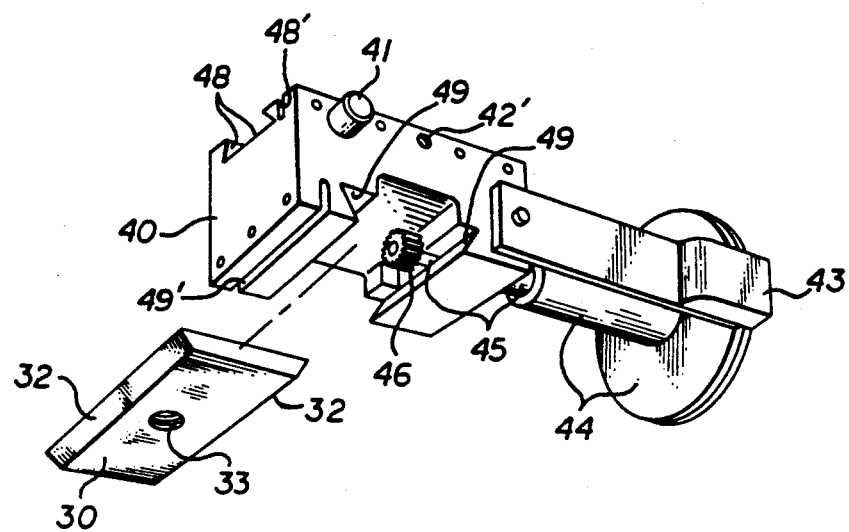
FIG. 6 is a bottom perspective view of the fine-focus stage, with the same lower dovetail attachment drawn displaced out of its operating track, and also showing the focus-scale wheel, witness arm, and shift-stage lower member (namely an upper dovetail track)
Figure 7:
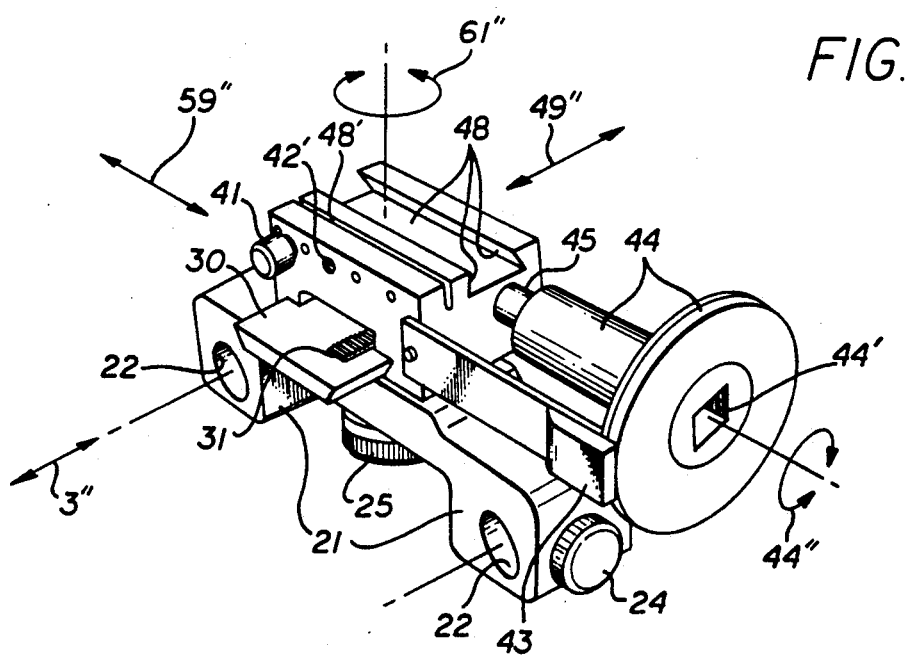
FIG. 7 is a top perspective view of all the FIGS. 4 and 5 components assembled together.

We shall now examine in greater detail the several stages 20/30-40-50-60-70-80-90, and their interconnections and operation. The first element or stage 20/30, as shown in FIGS. 4 and 5 as well as FIGS. 1 and 2, includes a pair of side lobes 21 spanned by a central bridge 23.

Passing through each side lobe 21 is a respective fore-and-aft hole 22, for receiving a corresponding one of the iris rods 3. Respective locking screws 24 are threaded through the outboard sides of the side lobes 21 and into the respective fore-and-aft through-holes 22. When the first stage 20 is on the iris rods 3, each locking screw 24 can be screwed inward to bear against the respective iris rod 3 and so lock the entire accessory 20-90 and lens 4 in place at a selected distance from the lens-mounting port 6—and thus at a selected coarse-focus point along the rods 3. Split lobes with lower, squeeze-action locking screws can be substituted.

Passed from below through a transverse slot 26 (FIG. 4) in the central bridge part 23 of the first stage 20 is a mounting screw, with knurled head, 25. This screw 25 engages a threaded blind hole 33 in the underside of the previously mentioned dovetail 30, cinching the dovetail 30 to the top of the bridge 23. A transverse slot 26 is preferred to a simple clearance hole for the screw 25, in the interest of providing a coarse lateral-shift preadjustment.

As will be seen, movement of the next stage along the dovetail 30 provides fine focus of the lens relative to the lens-mounting port 6 (and thus relative to the film plane, not shown, within the camera). Hence we shall sometimes refer to the dovetail 30 as a "fine-focus dovetail".

A geared rack 31 is screw-fastened into a slot in the flat top surface of the fine-focus dovetail 30. The dovetail 30 has, by definition, beveled longitudinal sides 32—which as shown are preferably wider at the top.

Figure 3:
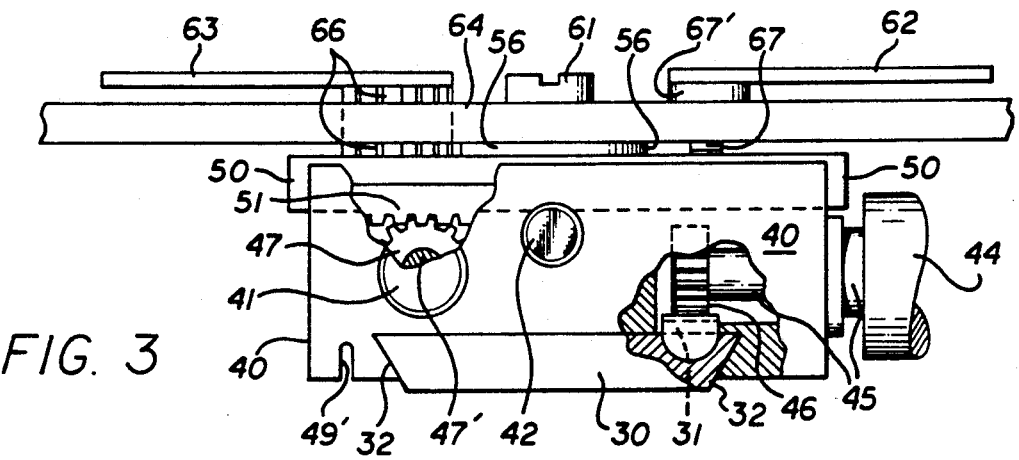
FIG. 3 is an enlarged front elevation of the fine-focus, shift (horizontal-translation), and swing (rotation about a vertical axis) stages of the same embodiment.

Illustrated in FIGS. 6 through 10, as well as FIGS. 1 through 3, is the interfitting of the fine-focus dovetail 30 with the fine-focus block 40. The dovetail slides fore-and-aft in a complementarily shaped track in the block, and is manually controlled by engagement of the rack 31 embedded in the dovetail with a pinion 46.

The pinion is keyed (or simply press-fitted) to a shaft 45, which is journalled through a side wall of the fine-focus block 40 and which also carries a focus rod and wheel 44. The operator rotates the rod manually, either directly or (for finer control) by means of a crank mated with an end-fitting 44' in the rod, to adjust the focus—i.e., axial distance between the lens 5 and the film plane inside the camera.

The operator reads the focus wheel against a straightedge 43. That straightedge, traditionally called a "witness arm", is also supported from the fine-focus block.

Cut into the underside of the fine-focus block, parallel to the fine-focus dovetail track 49, is a fore-and-aft relief slot 49' providing some resiliency of the right-hand edge of the dovetail track 49. This geometry amounts to an integral-spring arrangement, allowing a nominal slight interference fit between the edges 32 of the dovetail 30 and the walls of the track 49. If desired a precise desired degree of friction can be established and held by a set-screw (not shown) passed through a threaded hole in the right end of the fine-focus block 40 to bear against the left side of the relief slot 49'.

Sliding transversely in a transverse dovetail track 48 (FIGS. 6ff.) is the lateral-shift dovetail 50, whose beveled side walls 55 (FIG. 8) are larger at the bottom. A geared rack 51 is screw-fastened into the flat underside of the lateral-shift dovetail 50, and engages a pinion 47 (FIG. 3) that is held in a cavity within the fine-focus block 40.

This lateral-shift pinion 47 is keyed or press-fitted to a shaft 47', which passes through a front wall of the fine-focus block and terminates in a knob 41. The knob is manually operated to rack the lateral-shift dovetail 50 to left or right as desired.

A relief slot 48' is cut in the top of the fine-focus block 40, parallel to the lateral-shift track 48—to allow for slight interference fit as described just above for the fine-focus mechanism. If desired the shift motion can be locked by passing a screw 42 (FIGS. 8 through 10) into a threaded hole 42' (FIGS. 6 and 7), so as to bear against the rear edge of this relief slot 48'.

Alternatively if desired the threaded hole 42' can be used instead for a set-screw, to simply set and hold a precise desired degree of friction in the fit between the shift dovetail 50 and its track 48, as for the focus mechanism.

Three holes are threaded into the top of the shift dovetail 50, and used in control of the lateral rotation or swing motion of the frame 60-70-80 relative to the shift dovetail 50. The functions of these three holes appear more clearly in FIGS. 11 and 12, as well as FIG. 1.

The central hole 53 of the three receives the threaded tip of a shoulder screw 61, which serves as the swing pivot. The shoulder portion of the same pivot screw 61 passes through a mating hole 61' at the center of the flat yoke member 60 at the bottom of the frame 60-70-80.

Another hole 52, at the right side of the shift dovetail (left in FIG. 11), receives a threaded shaft 66' which carries a manually operated lever 63 and vertical pinion 66: rotating the lever 63 rotates the pinion 66. The pinion 66 engages a short rack 68 that is mounted in an orifice 68' in the yoke 60; consequently manual operation of the lever 63 and attached gear 66 forces the yoke 60 to rotate about the pivot screw 61.

The third hole 54, at the left side of the shift dove-tail (right side of FIG. 11) receives another threaded shaft 67, this one too carrying a lever 62. This shaft passes through an arcuate slot 69 in the yoke 60, and is used simply to cinch the yoke 60 against the shift dovetail 50, locking the two together against relative rotation.

In other words, the lever 62, cooperating with the threaded hole 54 and arcuate slot 69, serves as a swing-motion lock. Spacer washers 56 and 67" are interposed between the yoke 60 and shift dovetail 50, and between the locking-lever handle 62 and yoke 60, respectively—to permit smooth rotation between those two pairs of elements.

As may be seen from FIG. 1, the yoke 60 extends to both sides around the mirror housing 9, when the preferred embodiment of our invention is used with a camera 1 of the type that has such a lower central housing module 9. To put it another way, the mirror housing 9 projects forward into the region between the two outboard arms 65 of the yoke 60.

The more-nearly-planar rectangular portions 70-80 of the frame 60-70-80 accordingly rotate above the forward tip of the mirror housing module 9, but about an axis of rotation through the pivot screw 61 that is forward from the mirror housing module 9. This condition also may be described as swinging the lens about an axis that is displaced forward from a plane on which the lens is supported.

By virtue of this unusual support geometry the lens 4 is positioned relatively near to the lens-mounting port 6 of the camera, even though much of the adjustable mechanism 20-30-40-50 of our preferred embodiment is relatively far from the lens port. Equivalent alternative arrangements for the yoke 60 include a bowed or arcuate shape, instead of three distinct segments 64, 65 joined at corners; and also a yoke orientation that is not entirely flat—being instead angled downward toward the rear from a slightly elevated point.

Figure 12:
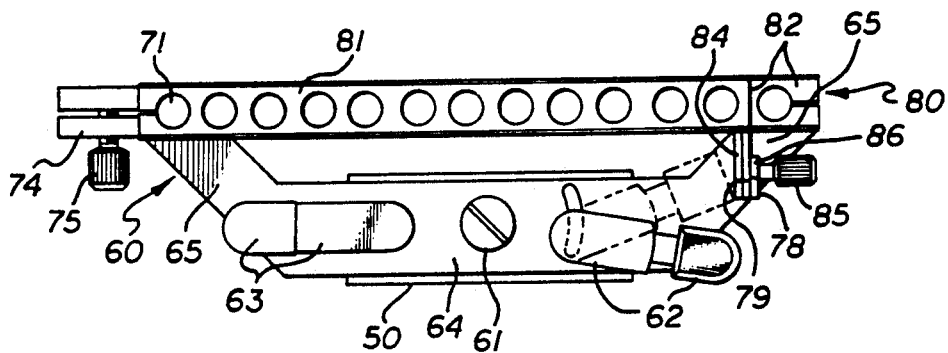
FIG. 12 is a top plan view of the FIG. 11 components.

FIGS. 2 and 12 also illustrate how the specialized configuration of our preferred embodiment uses a point that is relatively well removed from interferences with the forward-projecting mirror housing 9, for lens support, focus, shift and swing—but nevertheless uses a point relatively close to the lens-mounting port 6 for lens position. Only the rise-and-fall and tilt functions (detailed just below) are constrained within the limited space between the overhanging viewfinder module 8 and lower central mirror-housing module 9.

Figure 13:
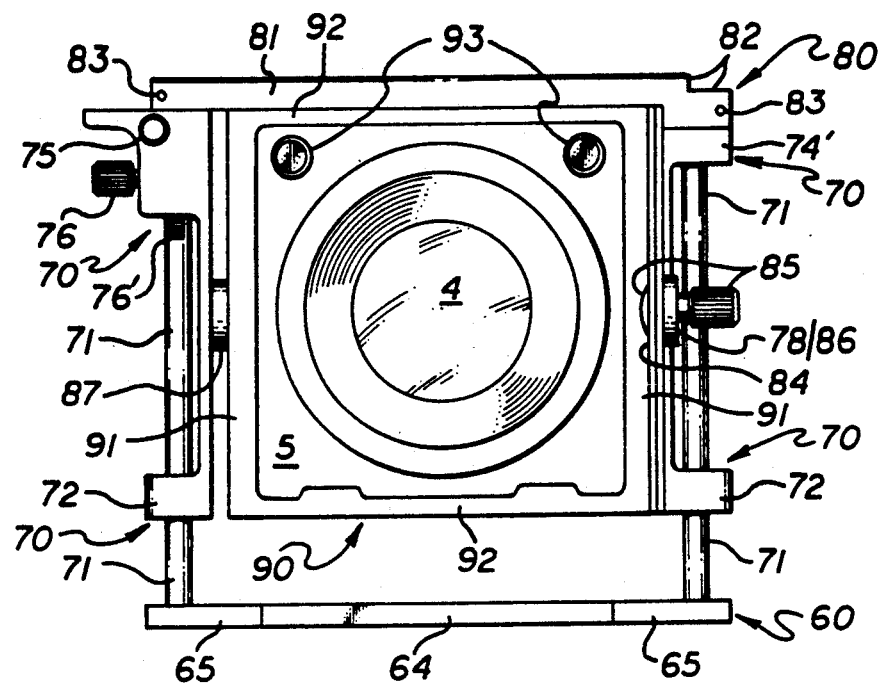
FIG. 13 is a front elevation of the same components, shown with the rise-and-fall stage moved fully upward.
Figure 14:
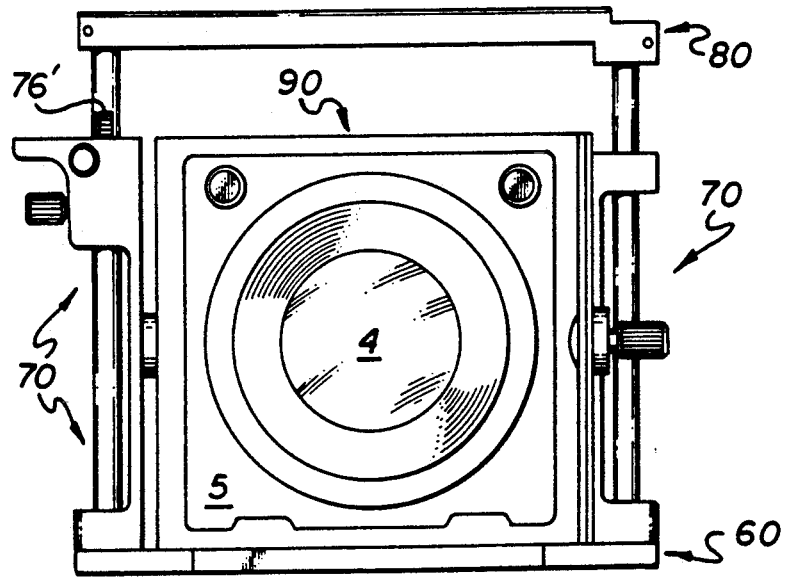
FIG. 14 is a front elevation of the same components, shown with the rise-and-fall stage moved fully downward.

As mentioned previously, only certain components 71 of the frame vertical elements 70—specifically, vertical rods 71 interconnecting the yoke 60 and top rail 80—are actually elements of the frame as such. Other components 72-73-74-74' of the frame vertical elements 70 slide vertically along the vertical rods 71, and accordingly make up the working part of the rise-and-fall elements or stage of our preferred embodiment. These elements accordingly permit movement of the lens board 5 and its mount 90—suspended on pivots 87 (see FIGS. 2 and 13)—between the extreme upward and downward positions shown in FIGS. 13 and 14 respectively.

Figure 11:
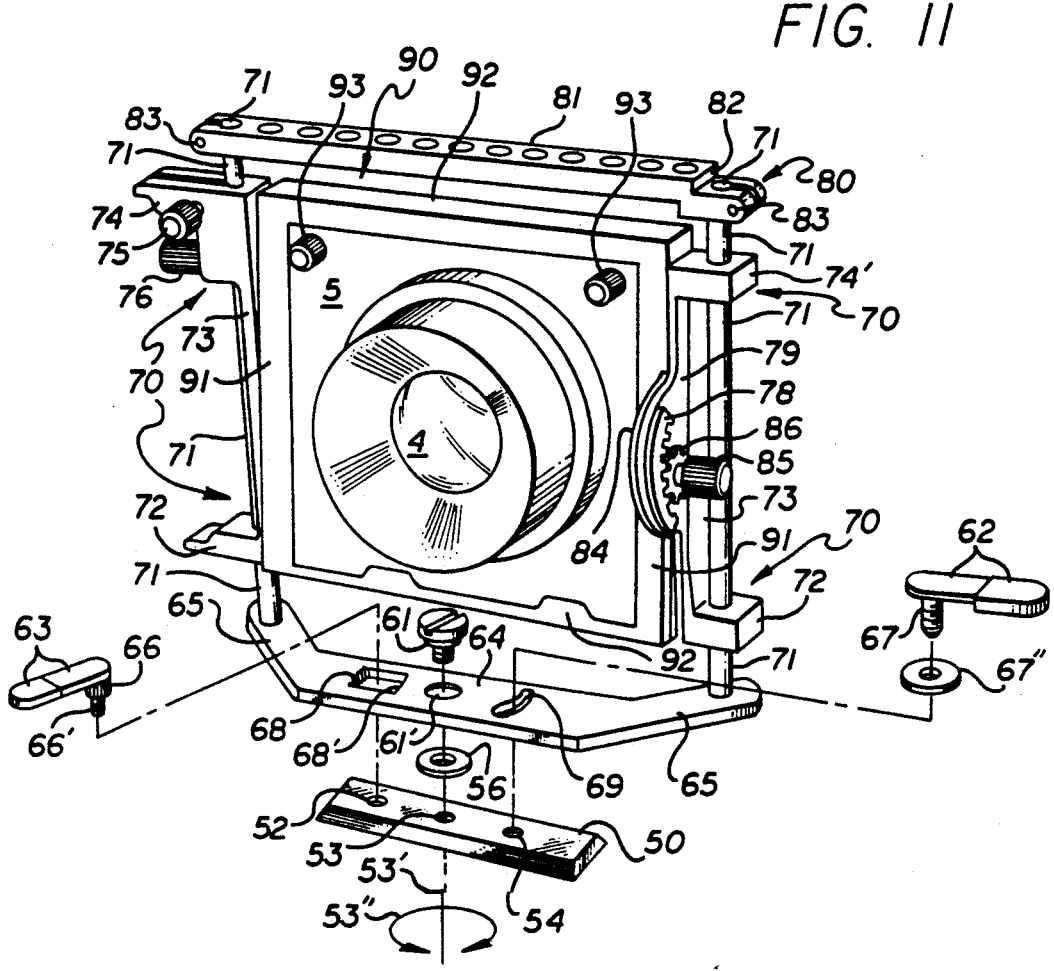
FIG. 11 is a partially exploded perspective view of the same shift-stage upper member and swing-stage lower member, together with the frame that provides the swing-stage upper member, rise-and-fall stage, tilt stage, and lens-board mount—and a representative lens board and lens.

As shown in FIGS. 11 and 12, the outboard tip of the upper right lobe 74 of the rise-and-fall stage 72-73-74-74' is split, and provided with a clamping screw 75 for locking the rise-and-fall stage at any selected vertical position. We prefer also to provide fine manual control for the rise-and-fall stage, as follows.

We cut a gear rack 76' (FIGS. 13 and 14) into the forward side of the right-hand vertical slide rod 71—generally in the manner of the racks 31, 51 mounted in the two dovetails 30, 50 discussed earlier. We also mount a mating pinion (not shown) in a cavity within the same upper right lobe 74.

The rack 76' and mating pinion are used for fine manual control of the rise-and-fall stage, by means of a knob 76. This knob is secured to the end of a shaft (not shown) that is journalled through the wall of the lobe 74 and into its interior cavity. The shaft interconnects the internal pinion with the external knob 76—generally in the manner of the shift control 41 discussed earlier.

Being supported by pivots 87 from the rise-and-fall stage vertical members 73, the lens-board mount or cage 90 can be tilted about a horizontal axis through the centers of those two pivots 87. The lens-board cage or mount 90 accordingly forms the tilt stage of the apparatus.

We prefer to provide fine control of tilting motion by use of a curved rack 78 that is attached as by brazing or screw-fastening to the outboard surface of a semicircular ear 79 formed on the forward edge of the left-hand vertical member 73 (FIG. 11) of the rise-and-fall stage. Radially inward from the curved rack is an arcuate slot 77 (FIG. 1) in the ear 79.

A similar semicircular ear 84 is formed on the forward edge of the immediately adjacent left-hand vertical member 91 of the lens-board cage 90, and the inboard end of a tilt adjustment shaft 85 (see FIG. 1) is secured to this ear 84 for rotation. The outboard end of the tilt adjustment shaft 85 is formed as a knob, and on the outboard side of the rise-and-fall ear 79 a thin pinion 86 (FIG. 11) is mounted to or formed on the shaft 85.

As best shown in FIG. 2, rotation of the tilt adjustment shaft 85 by means of its knob will rotate the associated pinion 86—thereby walking the pinion 86, and with it the shaft 85, up or down the arcuate rack 78. This movement of the shaft 85 carries with it the ear 84 that is fixed to the lens-board cage 90 (FIG. 1), and so forces the cage and the lens board 5 to tilt upward or downward respectively.

We mount the lens board 5 to the cage 90 by first inserting the lower edge of the lens board into an angled recess in the bottom cross-element 92 of the cage 90, and then securing the top of the board to the lens-board mount 90 using the retaining screws 93. This procedure clamps the lens board 5 (and lens) to the forward surfaces of the lens-board mount 90.

Although a major accomplishment of the preferred embodiment of our invention is to accommodate the lower central mirror-housing module 9 illustrated in FIGS. 1 and 2, not every professional cinematographer uses a camera 1 having that particular sort of protruding module. Those who do use such a camera 1 do not necessarily use it for every project.

Figure 15:
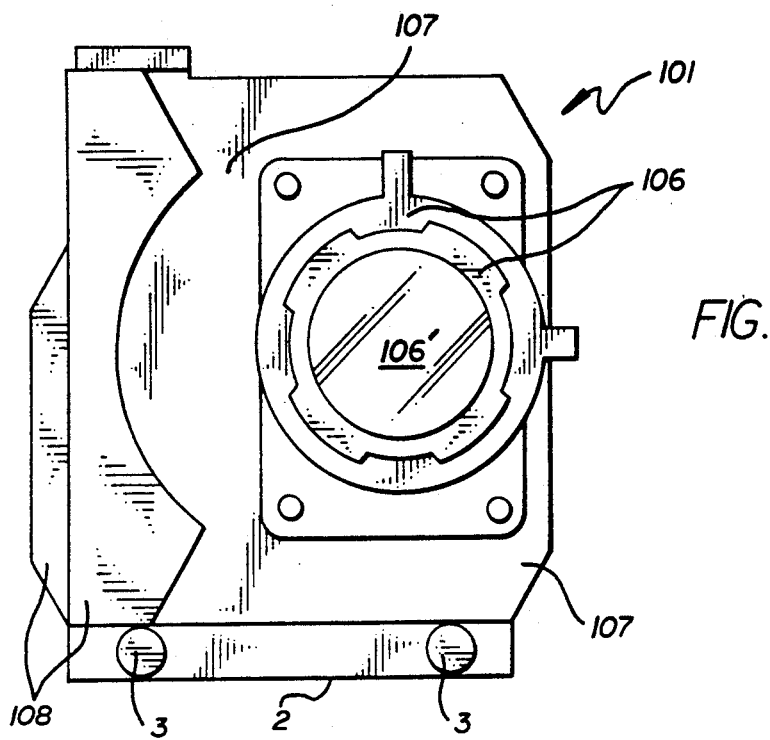
FIG. 15 is a rough representative view of a second type of motion-picture camera.
Figure 16:
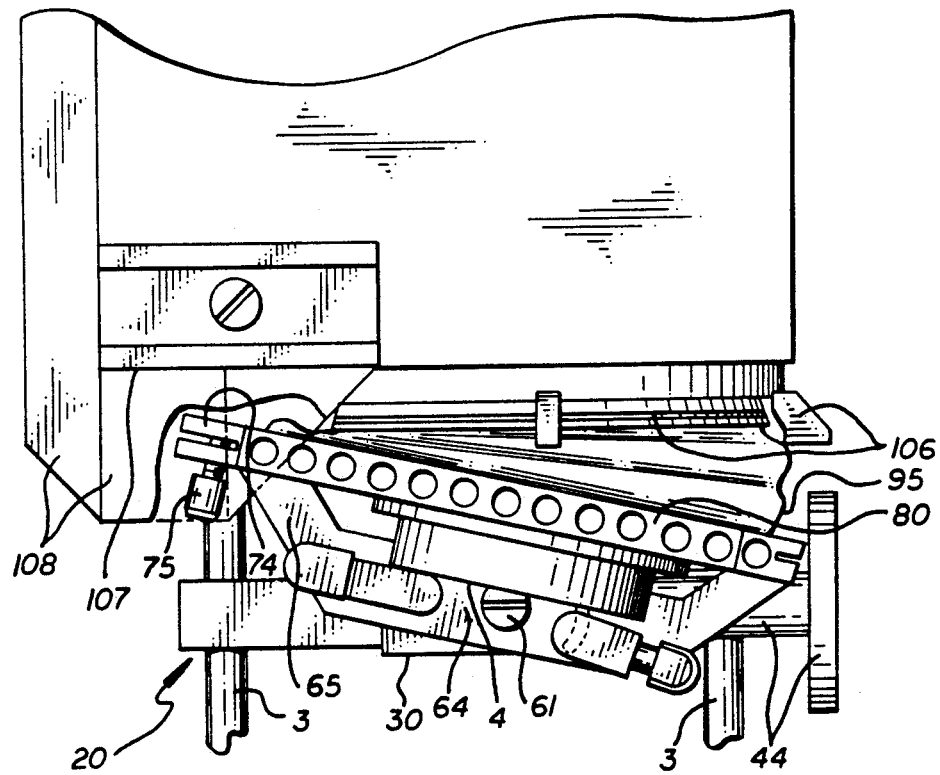
FIG. 16 is a top plan view, partly broken away, of a motion-picture camera of the FIG. 15 type together with the same preferred embodiment of our invention shown in FIGS. 1 through 14—and particularly showing a difficult but successful clearance of our invention with the camera.

In the type of camera construction shown in FIGS. 15 and 16, a segmented circular mirror does spin within the body of the camera 101. It is oriented vertically, however, and is behind a generally vertical front panel 107, which accordingly is just slightly further forward than the vertical panel 7 in the FIG. 1 camera—not protruding at all as far forward as the previously discussed mirror housing 9.

Instead, a finder housing 108 protrudes along the forward right-hand corner of the camera 101. The shape of the camera 101 in FIGS. 15 and 16 is very generally representative of the type of camera that uses such a vertically disposed right-side viewfinder 8. Prominent among cameras of this professionally very popular type is Arriflex's model III.

We have limited the width of the preferred embodiment of our invention so that, in particular, the lateral outboard projections 74, 72 from the right side of the swing frame clear the protruding finder housing 108 even when the lens is swung fully to the right. More specifically, those projections 74, 72 swing into a crescent-shaped slight recess formed next to the finder housing 108, and in front of the vertical front wall 107 of the camera 101—as generally shown in the cutaway portions of FIG. 16.

The preferred embodiment of our invention thus attains a doubly impressive accomplishment of accommodating the constraining geometries of two different cameras 1 and 101. We prefer, however, to accommodate two others still.

Figure 17:
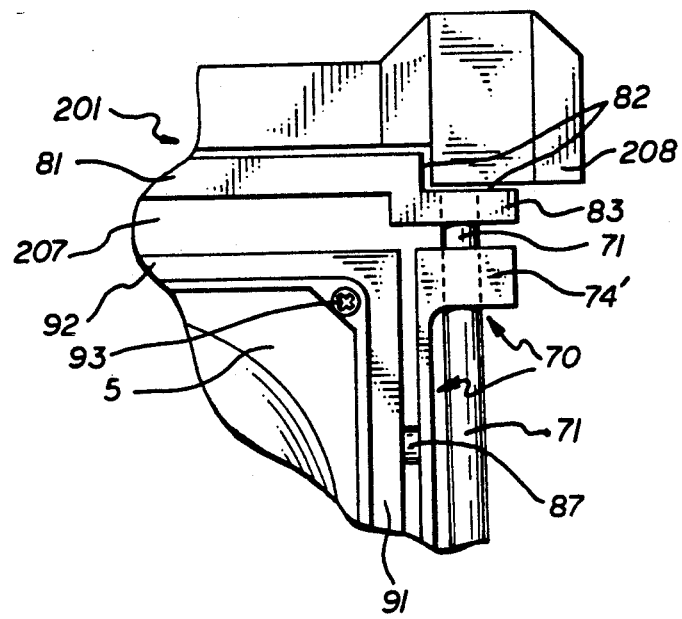
FIG. 17 is an upper-left-corner fragmentary front elevation of the same embodiment together with still another motion-picture camera, showing another difficult but successful clearance.

One such accommodation appears in FIG. 17. The shape of the camera 201 in FIG. 17 very generally represents a camera type that uses a longitudinally extended finder 208 along the upper left corner of the body (and also a protruding lower-central mirror housing even more extreme than that of FIG. 1).

Prominent among equipment of this professionally very popular type is the Moviecam brand camera. In the preferred embodiment of our invention, the top rail 80 of the frame 60-70-80 has a downward vertical step or dogleg section 82 to clear the viewfinder 208.

Figure 18:
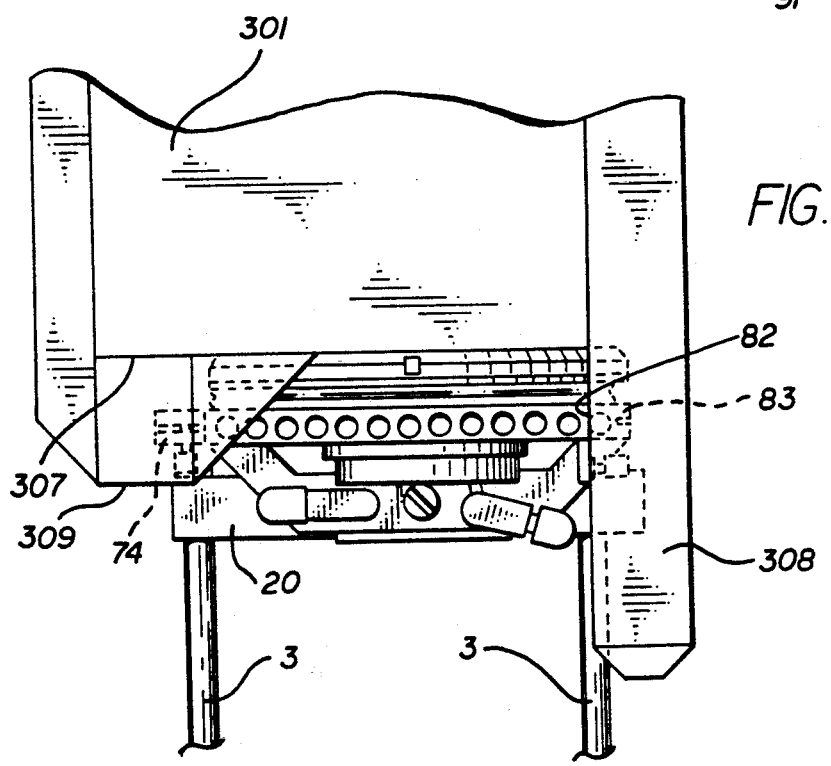
FIG. 18 is a top elevation of the same preferred embodiment with yet a fourth motion-picture camera, very generally showing two difficult but simultaneously successful clearances of the camera and accessory.

The remaining accommodation is shown in FIG. 18. Here the shape of the camera 301 is very generally representative of a type of camera that has both an upper-left-corner finder tube 308—similar to that in FIG. 17 but protruding considerably further forward—and a right-forward corner structure generally similar to that in FIGS. 15 and 16. Prominent among cameras of this type is the Panavision model called "Pana-Flex".

As mentioned earlier, our invention permits lens translation or rotation—or both—during filming of live action. For example, suppose that a cinematographer is to take motion-picture footage of a daredevil 411 who will leap from the top of a skyscraper 412 into a small pool 413 fifteen feet in front of the building, as diagrammed in FIG. 19.

During her fall 414 the stuntwoman 411 is to face the camera 401 and recite the first sentence of the Gettysburg address, enunciating clearly and slowly so that the splash at the bottom will form an exclamation mark directly following the word "equal." She will carry a small microphone and radio transmitter so that her voice and ambient sounds can be recorded for later synchronization with the film.

For best effect it is desired to show both the building 412 and the daredevil 411 constantly in sharp focus—and with no significant change in apparent size of the person 411, so that her calm articulation of the speech can be plainly recorded in addition to her downward progress past the many floors of the building.

The cinematographer sets up the camera at ground level thirty yards from the skyscraper face, precisely on a line with the pool, and with the camera back accurately parallel to the building face. The camera is fitted with our accessory, its rise-and-fall stage 72-74/74' and tilt stage 90 likewise accurately parallel with both the camera back and the building face, and a lens chosen to show the width of the building, but also to show the jumper's face clearly. (The conjunction of these two conditions is primarily a constraint on the width of the building employed.) In addition the cinematographer sets the tilt stage of our accessory accurately on center.

To test these adjustments, the camera is pointed directly toward the building face at lens level, the rise-and-fall stage 72-74/74' too set on center, and the lens carefully focused using the finder. Then the rise-and-fall stage 72-74/74' is racked up, without disturbing the focus setting, until the top of the building appears in the finder: it too should be sharply in focus.

Next the rise-and-fall stage is returned to its on-center position, and the camera focus is moved closer—to a point 415 just halfway between the building and the center of the pool. Then if necessary the aperture is stopped down just enough to hold both the building face and center of the pool in sharp focus—that is, the depth of focus is made at least plus-and-minus eight feet from the sharpest-focus plane 415.

Then the rise-and-fall stage is again racked up to show the daredevil 411 standing at the edge of the skyscraper 412 roof, her facial expression clearly visible, and the film advance is started. She pushes off from the edge (so as to land fifteen feet in front of the building, at the center of the pool) and commences her speech.

As she descends, she moves toward the plane 415 of sharpest focus eight feet in front of the skyscraper face, and then proceeds—at a point 416 about halfway down—through that plane to the fifteen-foot mark, at that point landing (safely) in the pool 413, one-half second after speaking the word "equal." The entire performance is captured simply by racking the rise-and-fall stage 72-74/74' smoothly downward, as suggested by the arrow 417, to keep the daredevil in the finder.

As will be apparent, the cinematographer may wish to practice this process using some object such as a dummy to determine how fast—and with what acceleration—the rise-and-fall stage must be moved. Compared with various more-common alternatives, however, the camera operator's work will be found extremely easy:

No need will arise for change of camera angle, focus, depth of focus or zoom. Yet the daredevil will appear substantially unchanged in size (i.e., as a fraction of the film frame) and sharply in focus over her whole trajectory 414, just as the building will appear consistent in width and sharply focused from top to bottom.

As will be apparent, for this type of usage the rise-and-fall stage (or any stage) control of the preferred embodiment of our invention can be moved manually—or can be readily attached to an automatic actuator. That device could be a small pneumatic or electric motor, perhaps operating through a vibration-absorbing link.

A motor in turn can be operated by a variable-speed control, with either manual adjustment or a programmer (such as a microprocessor device). The programmer can be set up to perform exactly the needed modifications during the scene.

Now we shall describe an analogous demonstration that makes use of lens swing. Suppose that the goal is to film two individuals 511, 512 who initially are standing side by side about fifty feet from the camera 501, and about ten feet apart—but one of whom then walks toward the camera and stops just four feet forward from the camera—all as diagrammed in FIG. 20.

To keep both people in sharp focus during this action without our accessory—and, say, without panning the camera 501—would ordinarily require focal depth extending from four out to fifty feet. This requirement would place a severe constraint on aperture.

Now we shall consider the focal relationships in more detail. The lens 5 defines an infinite family of planes 521, 521a, 521b of uniform focus.

If the camera 501 is aligned initially with the plane 513 defined by the two actors 511, 512 and the lens 5 is parallel with the film plane 516 as is conventional, all the planes 521, 521a, 521b of uniform focus are parallel with the actors' plane. Since the film plane 516 too is parallel to all these planes, moving the lens in and out images the film plane 516 at any desired plane 521, 521a, 521b, 513, etc. in the scene.

The end of the scene typically might be set up focused somewhat closer than halfway to the actors' starting plane 513, and with the required focal depth. Thus a focal plane 521 might be selected to focus a particular plane 516' in the scene onto the film plane 516.

Shooting might be started with that same focus—or instead might be set up with the focus out at the actors' starting plane 513, when the two individuals are side-by-side, and then moved in (closer to the camera) during the action to the preselected plane 521/516'. In either event, at the end of the action the focal errors would be (1) the distance along a perpendicular 517 from the rearward actor 512 to the focal plane 516'/521, and (2) the distance along a perpendicular 518 from the final position 511' of the forward actor to the same focal plane 516'/521.

Suitable selection of the focal plane 516'/521 should roughly equalize these errors in optical effect, thereby splitting the difference as is common in photography. Nevertheless the depth of focus must accommodate both these errors, which under the described conditions as can be seen from the diagram will require an extremely high f/number with all the usual drawbacks.

Figure 21:
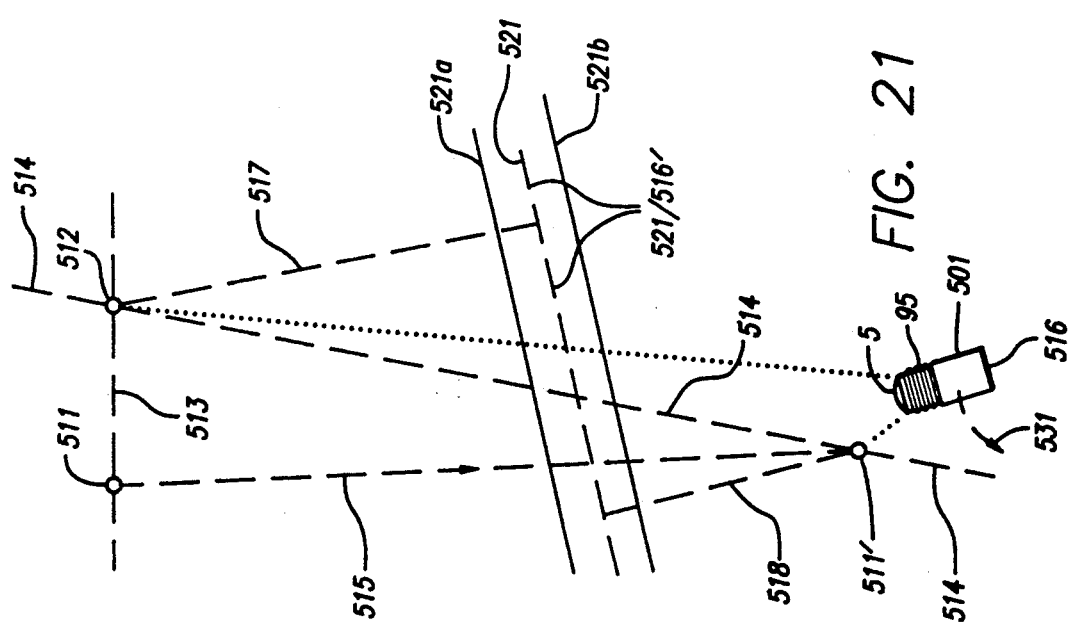

Some relief from the severity of these conditions might be sought without resort to our accessory by panning the camera slightly to the left as suggested by the arrow 531 in FIG. 21. This would help to keep both actors in the scene as well as splitting the focal difference in another way.

As can be seen from the diagram, the entire family of lens-defined focal planes 521, 521a, 521b would thereby be rotated. The result would be a slight decrease in the lengths of the focal-error perpendiculars 517 and 518 from the actor positions 514, 511' to the selected focal plane 516'/521. From the diagram it appears that the required depth of focus might be reduced to about forty-two feet (extending from four out to forty-six), down from the original forty-six feet (from four out to fifty).

In this setup, as before, the plane 516' that is imaged onto the film plane 516 remains in congruence with some one plane 521 of uniform focus defined by the lens. This remains so because the lens 5 is still being held parallel with the film plane 516.

Figure 22:
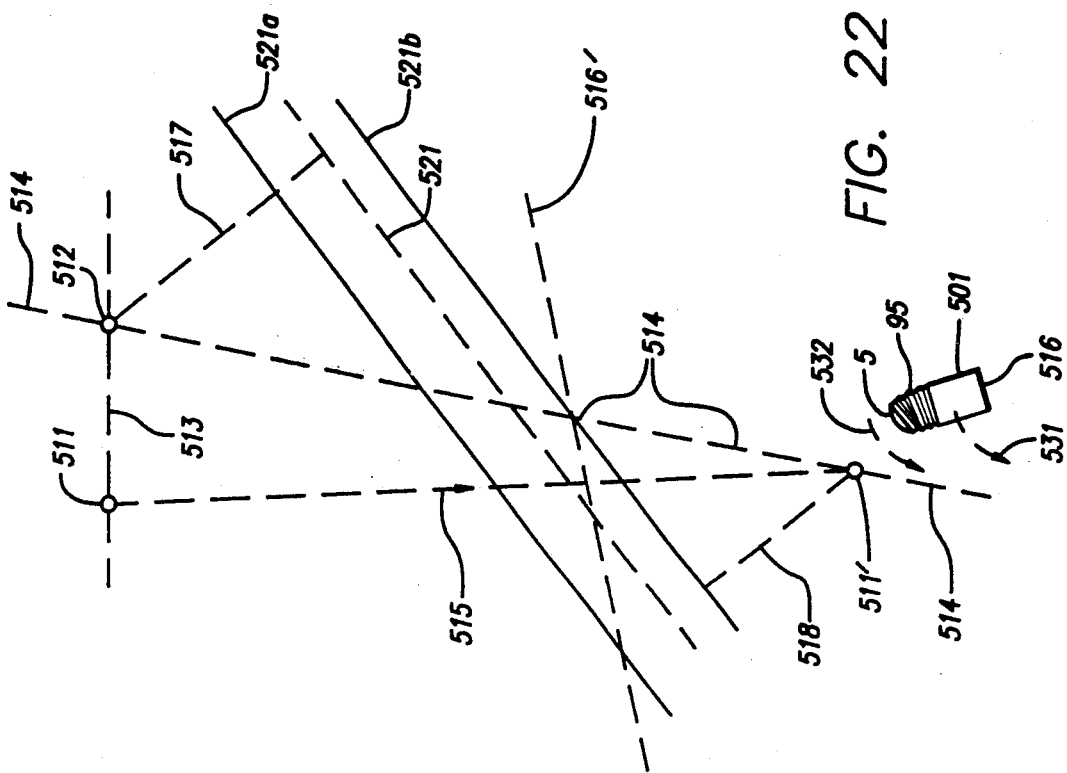

Using our accessory, however, the action could be better accommodated by also swinging the lens toward the moving actor, as suggested by the arrow 532 in FIG. 22. In theory, as an extreme case, the plane 516' of focus in the object space (that is, in the scene) could be precisely lined up with the plane 514 joining the final positions of the two actors.

Such an arrangement, however, would be generally undesirable—because the plane of focus in the image space (that is to say, inside the camera and near the film) would be severely nonparallel with the film plane. The focal errors as seen on the film would be just as great as in the setup of FIG. 21, although all the errors would be in the image space rather than in the object space or scene.

To make good use of the swing capability of our accessory, the camera operator should instead swing the lens only far enough to—here again—split the difference so that focal errors in the object and image spaces are roughly equalized. For example, as shown in FIG. 22, the family of uniform-focus planes 521, 521a, 521b can be rotated (with the lens 5) so that a selected plane 521 roughly bisects the angle between (1) the plane 514 joining the final positions 511', 514 of the actors and (2) the plane 516' that is imaged (but not focused) onto the film plane 516.

The focal-error lines 517, 518 are not of zero length as in the extreme case discussed in the second preceding paragraph, but as can be seen by comparing FIGS. 21 and 22 they are only about two-thirds as long as achieved without swing. Focal error in the image space, however, is now of approximately equal severity to the error in the object space—thereby producing the best possible imaging for the required final geometry of the actors relative to the camera position.

From the general appearance of the diagram it might be estimated that the equivalent total depth of focus now required (namely, the sum of the distances between each actor and the selected plane 521 of uniform focus) might be about thirty feet—extending from four feet out to about thirty-four feet—rather than forty-six (from four out to fifty) as in the pan-only example of FIG. 20.

The main point of FIGS. 20 through 22 and of the present discussion is that the operator can maneuver the swing adjustment 532, along with the conventional slight pan 531 of the camera and inward focal displacement, during the live action. All three adjustments can be changed continuously while the shoot progresses.

If all three movements are reasonably uniform in rate, from the initial setup focused flat on the actors' initial plane 513 to the diagrammed condition of FIG. 22 at the end of the action, a reasonably close approximation to the best possible focal compromise will be achieved at each point along the action as well. That is to say, both actors will be held well in focus as the moving person 511 proceeds along the path 515; in fact, since the scene is set up to provide the best possible focal compromises in the most demanding final configuration, all the intermediate positions are likely to be focused considerably better than the final positions.

In principle the camera could be set far enough to the left, and the shift stage started far enough to the right, to entirely obviate the need for moving 532 the swing stage (or panning 531 the camera) at all. The two actors could both be held in focus by progressive leftward adjustment of the shift stage alone, in a horizontal analog of the skyscraper setup.

As a practical matter, however, this extreme approach would result in the two actors appearing the same size even though one was much further away—ordinarily an undesirable distortion—and also could result in a conspicuous change in point of view or apparent camera angle as seen in the final frames. Taking up only a part of the action in shift, however, would minimize those effects, and in combination with the swing 532 shown in FIG. 22, and somewhat greater camera pan 531, could reduce needed focal depth to, say, half or a third of that in FIG. 22.

Tilt examples can be readily conceptualized as vertical equivalents of the swing motions just discussed. All these motions can be effected manually during filming, or can be automated, generally as discussed above for rise-and-fall.

In our preferred embodiment we have made use of vertical and horizontal axes for the several motions involved, and we have chosen to distribute stresses on the upper portions of the mechanism over framework modules. Such modules consist of generally opposed elements—positioned at both sides (including top and bottom) of the lens—such as, for example, the left and right vertical rods 71 of the swinging frame 60-70-80, and vertical members 91 of the lens-board mount 90.

Analogously opposed elements include the top rail 80 and yoke 60 of the swinging frame 60-70-80, and horizontal members 92 of the lens-board mount 90. We believe that it is within the scope of some aspects of our invention to employ instead "frames" having single elements at just one side of the lens.

Such unilateral construction would require that each element be stronger—and would also require corresponding strengthening of the sliding guides and pivots of the supported elements. From these comments it will be clear that the yoke 60 and top rail 80 might be replaced by a heavier-duty single horizontal arm, and the opposed vertical rods accordingly by a heavier-duty single vertical rod, and so forth. Noninterference with the circular mirror housing on the first and third cameras is achieved by avoiding extension of the arm across the region just below the lens.

We believe that it is also within the scope of some aspects of our invention to provide motions that are not necessarily referred to vertical and horizontal axes. For example, by rotation of a major support stage about the lens axis, either an opposed-element framework or a unilateral-arm structure can be reoriented to provide translational or rotational motion relative to any axis—selected almost arbitrarily.

The word "almost" in the last sentence bears explanation. Except for focal adjustments, a movement axis has significant utility in the context of our invention only if the axis is in a plane generally parallel to that of the film.

If this condition is not met—that is, if a nonfocal adjustment has a significant projected component perpendicular to the film plane—then manipulation of that adjustment will also have a mixed effect on focus. Such a mixed effect is ordinarily undesirable.

As previously explained in detail, our preferred embodiment is also supported from iris rods of a balance-plate accessory. When we began to develop an overall apparatus configuration, however, it was far from self evident that support from the balance-plate rods would be best.

To the contrary, prior configurations employed in the field of SLR still cameras—to the extent relevant at all—suggested that support from the lens-mounting port of the camera was most natural. Such configurations have the advantage of obviating the need for a bellows and a separate support system.

In fact, in our first attempts we supported a lens-disposing-and-orienting accessory from the lens-mounting port on the camera. That philosophy of the apparatus was particularly appealing in that it required just one point of attachment to the camera, making the accessory as simple as possible to install, use and remove.

Moreover, both structural support and optical alignment were to be effected from a common element of the camera. This consideration seemed to ensure that there would be minimal opportunity for uncontrolled vibration or other movement of the accessory (and lens) relative to the lens-mounting port.

In those first attempts we analyzed our system on the basis of relative-movement stages that were all self sealing—or that might all be enclosed in common within a single bellows. We invested very extensive time and effort to confront the many difficulties of accommodating the various camera geometries.

Particularly problematic among those difficulties was the severely constrained available space surrounding the lens ports in the various cameras. We concluded that self-sealing movement joints and unitary lens-port mounting would be relatively uneconomic, if feasible at all, at least for an accessory that could be used with a variety of cameras.

Accordingly we decided upon use of a bellows, non-self-sealing movement joints, and a system of supporting the moving stages from a point well in front of the lens port. Our next efforts, however, still concentrated on supporting the accessory stages from the lens-mounting port, but indirectly.

That support system included rods (analogous to iris rods) that were supported from a relatively heavy-duty adapter which engaged the lens-mounting port of the camera. The accessory stages were supported from the rods.

Our philosophy of that configuration was still to retain the most simple mounting arrangement possible—that is, a unitary point of attachment of the entire accessory to the camera—to preserve both simplicity of use and minimal interfering vibrations, as mentioned earlier. We actually constructed such a system in prototype form and tested it.

We found, however, that stable and solid operation required more massive rods than first anticipated. Upon designing details of such a sturdier rod-support system, we came to grips with a major obstacle: the entire accessory would now be so heavy as to place undue stresses on the lens-mounting port of the camera.

As will be appreciated, one of the last things that an accessory for an extremely expensive cinematographic camera should be allowed to do is damage the camera. While we considered it possible to eventually develop a lens-port-mounted configuration that would minimize this risk, we believed that the residual chance of camera damage remained significant.

This consideration appeared particularly problematic because the accessory weight was not the sole possible source of deformation forces. The accessory would have many different projecting pieces and components that could be accidentally snagged by clothing or by other cinema equipment.

Furthermore, we realized, even if the camera itself were not actually damaged the added weight might introduce temporary deformation sufficient to disturb the focus or perhaps allow slight light leakage. Only at this point were we able to see that an ideal configuration for cinematographic equipment should entail support from an independent structural element, rather than from the lens port—which is in a sense an optical element.

Our earlier concerns about simplicity of attachment were alleviated when we worked out the balance-plate mounting system. We realized how familiar and comfortable it would be to cinematographers, as they are accustomed to supporting a variety of lenses and other accessories from the iris rods.

Our previous concerns about possible focal disturbances arising from vibration between the support and the lens were likewise alleviated. We noted that the conventional iris rods were extremely massive and stable, in comparison with anything that we could hope to mount from the lens-mounting port on the camera.

If additional shock isolation is required, the accessory first stage 20 can be split—between the rod-gripping lobes 21 and the bridge 23, for example—and shock-absorbing mounts can be interposed between those two sections. Accordingly we have concluded that ideal embodiments of our invention are supported from balance-plate iris rods or like sturdily mounted fore-to-aft rail means.

The first intermediary element 20 of our preferred embodiment fits any standard iris rods 3. In event a nonstandard balance plate or nonstandard rods are encountered, replacement of the first intermediary element 20 with an equivalent piece modified to fit the nonstandard plate or rods would be very straightforward.

We consider it within the scope of certain aspects of our invention, however, to support an embodiment of our invention from the lens-mounting port of the camera. Such an embodiment might be intended for use with just one camera, or a more limited selection of cameras; or might have a significantly more limited number of movements: any such simplifications would enhance the utility of mounting the accessory from the lens port.

In the preferred embodiment of our invention that we have illustrated and discussed, we prefer to use approximately these representative dimensions and angles for travel and for the sizes of the components:

|  | centimeter(s) | inch(es) |
|---|---|---|
| maximum travel: |  |  |
| rise-and-fall stage 72-74/74' | ±0.97 | ±0.38 |
| shift stage 50 | ±1.27 | ±0.50 |
| swing stage 60-70-80 |  | ±25 degrees |
| tilt stage 90 |  | ±30 degrees |
| size: |  |  |
| overall height, underside of iris-rod lobes 21 to top of top rail 80 | 19 | 7.56 |
| frame height, bottom of yoke 60 to top of top rail | 12.7 | 5.00 |
| overall width at yoke 60 | 16 | 6.25 |
| horizontal offset from swing pivot axis 61 back to centerline of lens board 5 | 2.1 | 0.81 |
| downward step 82 in top rail 80 | 0.64 | 0.25 |
| top rail 80 cross-section | 0.64 × 1.12 | 0.25 × 0.44 |
| vertical rod 71 diameter | 0.64 | 0.25 |
| yoke 60 cross-section | 0.79 | 0.31 at rods 71; |
|  | 0.49 | 0.19 elsewhere. |

Although the shift stage of our preferred embodiment is capable of about thirteen millimeters' excursion to either left or right from center, travel somewhat less than ten millimeters is as much as normally desired. In addition, extreme shifts do introduce some risk of vignetting, and this risk can be exacerbated by filter holders and lens shades. To check for vignetting, the operator should inspect the ground-glass edges at the f/ stop that will be used for the exposure.

It will be understood that the foregoing disclosure is intended to be merely exemplary, and not to limit the scope of the invention—which is to be determined by reference to the appended claims.

We claim:

1. A variable-position lens-mounting accessory for use with any one of three or more standard motion-picture cameras selectably, each of said cameras having a camera body and a lens-mounting port on the camera body, and each of said cameras defining a film plane for exposure of motion-picture film, and a first one of such cameras having a generally central mirror housing that protrudes forward from a lower portion of the camera body, and a second one of such cameras having a mirror housing protruding forward along a right side of the camera body, and a third one of such cameras having a viewfinder protruding forward from an upper portion of the camera body; and for use with generally fore-and-aft support-rail means secured to the camera body; and for use with a photographic lens; said accessory comprising:

a first intermediary element slidably mounted substantially directly to such support-rail means for fore-and-aft sliding motion along such rail means; and manually operable means for locking the first element to such rail means, when desired to prevent sliding of the first element along such rail means;

another intermediary element supported from the first intermediary element for rotation about a generally vertical axis, and comprising a very generally rectangular frame which includes:

a lower member that is shaped as a very generally flat yoke with (a) a central portion surrounding said rotational axis and extending sideward from said axis, and with (b) outboard portions that extend rearward from the central portion, generally vertical members extending upward from outboard ends of said outboard portions, and an upper member that is very generally horizontal and interconnects upper ends of the generally vertical members to form therewith the top of said frame;

the vertical and upper members of the frame being suspended by said yoke-shaped lower member, and rotating, very generally above such central lower mirror housing of such first camera when the accessory is used with such first camera; whereby the lower member during rotation, by virtue of said yoke shape, does not interfere with such central lower mirror housing of such first camera;

said frame being sufficiently narrow, at least on its right side, to clear such mirror housing of such second camera;

said upper member defining a dip at one side to clear such viewfinder on such third camera; and a plurality of additional intermediary elements, mounted in a sequence from said other element to provide a plurality of translational or rotational components of motion relative to the first element, and including as a last element of said sequence a lens-board mount for mounting such photographic lens;

a bellows having a front end that is secured substantially directly to the lens-board mount, and a rear end; and an adapter secured substantially directly to the rear end of the bellows, said adapter being engageable with such lens-mounting port of such motion-picture camera;

whereby such lens, when in use, is disposed and oriented in a selectable manner relative to such film plane.

2. A variable-position lens-mounting accessory for use with any one of three or more standard motion-picture cameras selectably, each of said cameras having a camera body and a lens-mounting port on the camera body, and each of said cameras defining a film plane for exposure of motion-picture film, and a first one of such cameras having a generally central first module that protrudes forward from a lower portion of the camera body, and a second one of such cameras having a second module protruding forward along a right side of the camera body, and a third one of such cameras having a third module protruding forward from an upper portion of the camera body; and for use with generally fore-and-aft support-rail means secured to the camera body; and for use with a photographic lens; said accessory comprising:

a first intermediary element slidably mounted substantially directly to such support-rail means for fore-and-aft sliding motion along such rail means; and manually operable means for locking the first element to such rail means, when desired to prevent sliding of the first element along such rail means;

a second intermediary element supported from the first intermediary element for generally lateral motion, from a central position, relative to the first intermediary element, a third intermediary element mounted substantially directly to the second intermediary element for rotation about a generally vertical axis relative to the second intermediary element, said third intermediary element comprising a very generally rectangular frame which includes:

a lower member that is shaped as a very generally flat yoke with (a) a central portion surrounding said rotational axis and extending sideward from said axis, and with (b) outboard portions that extend rearward from the central portion, generally vertical members extending upward from outboard ends of said outboard portions, and an upper member that is very generally horizontal and interconnects upper ends of the generally vertical members to form the top of the frame;

said vertical and upper members of the frame being suspended by said yoke-shaped lower member, and rotating, very generally above such central first module of such first camera when the accessory is used with such first camera; whereby the lower member during rotation, by virtue of said yoke shape, does not interfere with with such central lower module of such first camera;

said frame being sufficiently narrow, at least on its right side, to clear such second module of such second camera, at least when said second intermediary element is disposed generally near its said central position;

said upper member defining a dip at one side to clear such third module on such third camera;

a plurality of additional intermediary elements, mounted in a sequence from the third element to provide a plurality of translational or rotational components of motion relative to the first element, and including as a last element of said sequence a lens-board mount for mounting such photographic lens;

a bellows having a front end that is secured substantially directly to the lens-board mount, and a rear end; and an adapter secured substantially directly to the rear end of the bellows, said adapter being engageable with such lens-mounting port of such motion-picture camera;

whereby such lens, when in use, is disposed and oriented in a selectable manner relative to such film plane.

3. The accessory of claim 2, wherein the additional intermediary elements comprise:

a fourth intermediary element mounted substantially directly to the third intermediary element for generally vertical motion along the generally vertical members of the second-intermediary-element frame, substantially without interfering with such first, second or third module, when the accessory is used with such first, second or third camera respectively;

a fifth intermediary element mounted substantially directly to the fourth intermediary element for rotation about a generally transverse axis within said frame, substantially without interfering with such first, second or third module, when the accessory is used with such first, second or third camera respectively; and a sixth intermediary element that is mounted substantially directly to and between the first and second intermediary elements for generally fore-and-aft relative motion of the second intermediary element relative to the first intermediary element, substantially without interfering with such first, second or third module, when the accessory is used with such first, second or third camera respectively.

4. The accessory of claim 3, further comprising:

manually operable gear means interconnecting said first and second intermediary elements to provide relatively fine manual control of said generally lateral motion;

manually operable gear means interconnecting said third and fourth intermediary elements to provide relatively fine manual control of said generally vertical motion; and manually operable gear means interconnecting said fifth and sixth intermediary elements to provide relatively fine manual control of said generally vertical motion.

5. A variable-position lens-mounting accessory for use with any one of three or more standard motion-picture cameras selectably, each of said cameras having a camera body and a lens-mounting port on the camera body, and each of said cameras defining a film plane for exposure of motion-picture film, and a first one of such cameras having a generally central mirror housing that protrudes forward from a lower portion of the camera body, and a second one of such cameras having a mirror housing protruding forward along a right side of the camera body, and a third one of such cameras having a view-finder protruding forward from an upper portion of the camera body; and for use with a photographic lens; said accessory comprising:

a first intermediary element mounted for fore-and-aft motion relative to such lens-mounting port, and manually operable focal controls at the left side of the accessory for controlling said fore-and-aft motion;

a second intermediary element supported from the first intermediary element for generally lateral motion, from a central position, relative to the first intermediary element;

a third intermediary element mounted substantially directly to the second intermediary element for rotation about a generally vertical axis relative to the second intermediary element, said third intermediary element comprising a very generally rectangular frame which includes:
  a lower member that is shaped as a very generally flat yoke with (a) a central portion surrounding said rotational axis and extending sideward from said axis, and with (b) outboard portions that extend rearward from the central portion,
  generally vertical members extending upward from outboard ends of said outboard portions, and
  an upper member that is very generally horizontal and interconnects upper ends of the generally vertical members to form therewith the top of said frame;
the top of the frame being suspended by said yoke-shaped lower member, and rotating, very generally above such central mirror housing of such first camera, when the accessory is used with such first camera; whereby the lower member during rotation, by virtue of said yoke shape, does not interfere with such central lower mirror housing of such first camera;
said frame being sufficiently narrow, at least on its right side, to clear such mirror housing of such second camera, at least when said second intermediary element is disposed generally near its said central position;
said upper member defining a dip at one side to clear such viewfinder on such third camera; and
a plurality of additional intermediary elements, mounted in a sequence from the third element to provide a plurality of translational or rotational components of motion relative to the first element, and including as a last element of said sequence a lens-board mount for mounting such photographic lens; and
an adapter secured to one of said three intermediary elements, said adapter being engageable with such lens-mounting port of such motion-picture camera;
whereby such lens, when in use, is disposed and oriented in a selectable manner relative to such film plane.

6. The accessory of claim 5, wherein the additional intermediary elements comprise:
  a fourth intermediary element mounted substantially directly to the third intermediary element for generally vertical motion along the generally vertical members of the second-intermediary-element frame, substantially without interfering with such first generally central lower mirror housing of such first camera, such mirror housing of such second camera, or such viewfinder of such third camera, when the accessory is used with such first, second or third camera respectively;
  a fifth intermediary element mounted substantially directly to the fourth intermediary element for rotation about a generally transverse axis within said frame, substantially without interfering with such mirror housings of such first or second camera, or such viewfinder of such third camera, when the accessory is used with such first, second or third camera respectively; and
  a sixth intermediary element that is mounted substantially directly to and between the first and second intermediary elements for generally fore-and-aft relative motion of the second intermediary element relative to the first intermediary element, substantially without interfering with such mirror housings of such first or second camera, or such viewfinder of such third camera, when the accessory is used with such first, second or third camera respectively.

7. The accessory of claim 6, further comprising:
  manually operable gear means interconnecting said first and second intermediary elements to provide relatively fine manual control of said generally lateral motion;
  manually operable gear means interconnecting said third and fourth intermediary elements to provide relatively fine manual control of said generally vertical motion; and
  manually operable gear means interconnecting said fifth and sixth intermediary elements to provide relatively fine manual control of said generally vertical motion.

8. A variable-position lens-mounting accessory for use with any one of three or more standard motion-picture cameras selectably, each of said cameras having a camera body, and defining a film plane for exposure of motion-picture film, and having on the camera body a lens-mounting port that is generally characterized by a mounting-port plane parallel to the film plane; and a first one of such cameras having a generally central mirror housing that protrudes forward from a lower portion of the camera body, and a second one of such cameras having a mirror housing protruding forward along a right side of the camera body, and a third one of such cameras having a viewfinder protruding forward from an upper portion of the camera body; and for use with a photographic lens; said accessory comprising:
  a first intermediary element mounted for fore-and-aft motion, relative to such lens-mounting port, and manually operable focal controls at the left side of the accessory for controlling said fore-and-aft motion;
  at least one intermediary translational-motion element mounted for translational motion in a plane that is at least very generally parallel to such mounting-port plane;
  at least one intermediary rotational-motion element mounted for rotation about an axis which lies in a plane that is at least very generally parallel to such mounting-port plane;
  a frame which is supported relative to the camera body, and which supports at least some of said intermediary elements, and which includes at least one substantially linear member that extends alongside but substantially not beneath such lens when such lens is in use, said alongside extension being in a plane that is at least very generally parallel to such mounting-port plane;
  whereby when the accessory is used with such first camera the substantially linear member during motion, by virtue of its nonextension beneath such lens in a plane at least very generally parallel to such mounting-port plane, does not interfere with such central lower mirror housing of such first camera;
  said frame being sufficiently narrow, at least on its right side, to clear such mirror housing of such second camera, at least when said second intermediary element is disposed generally near its said central position;

said frame being vertically relieved on at least one side to clear such viewfinder on such third camera;

whereby all of the intermediary elements operate substantially without interference with such first generally central lower mirror housing of such first camera, such mirror housing of such second camera, or such viewfinder of such third camera, when the accessory is used with such first, second or third camera respectively;

a lens-board mount, supported from all of the intermediary elements, for mounting such photographic lens; and an adapter attached to one of said intermediary elements, said adapter being engageable with such lens-mounting port of such motion-picture camera;

whereby such lens, when in use, is disposed and oriented in a selectable manner relative to such film plane.

9. The accessory of claim 8, wherein the at least one intermediary translational-motion element comprises:
   a second intermediary element mounted for generally lateral motion from a central position, relative to such lens-mounting port; and
   another intermediary element mounted for generally vertical motion, relative to such lens-mounting port.

10. The accessory of claim 9, wherein the at least one intermediary rotational-motion element comprises:
    a third intermediary element mounted for rotation about a generally vertical axis, relative to such lens-mounting port; and
    still another intermediary element mounted for rotation about a generally transverse axis, relative to such lens-mounting port.

11. The accessory of claim 10, wherein the at least one intermediary rotational-motion element comprises:
    an intermediary element mounted for rotation about a generally vertical axis, relative to such lens-mounting port; and
    still another intermediary element mounted for rotation about a generally transverse axis, relative to such lens-mounting port.

12. The accessory of claim 8, wherein the frame comprises:
    a lower member that is shaped very generally as a yoke with (a) a central portion extending sideward, and with (b) two outboard portions that extend from the central portion;
    generally vertical members extending upward from outboard ends of said outboard portions, respectively; and
    an upper member that is very generally horizontal and interconnects upper ends of the generally vertical members to form therewith a very generally rectangular frame which, when the accessory is used with such first camera, operates very generally above such central mirror housing of such first camera;
    whereby, when the accessory is used with such first camera, the lower member during motion, by virtue of said yoke shape, does not interfere with such central lower mirror housing of such first camera;
    said upper member defining a dip at one side to clear such viewfinder on such third camera.

13. A variable-position lens-mounting accessory for use with any one of four or more standard motion-picture cameras selectably, each of said cameras having a camera body, and defining a film plane for exposure of motion-picture film, and having on the camera body a lens-mounting port that is generally characterized by a mounting-port plane parallel to the film plane; and a first one of such cameras having a generally central mirror housing that protrudes forward from a lower portion of the camera body, and a second one of such cameras having a mirror housing protruding forward along a right side of the camera body, and a third one of such cameras having a viewfinder protruding forward from an upper portion of the camera body, and a fourth one of such cameras having a mirror housing protruding forward along a right side of the camera body and also a viewfinder protruding forward from an upper portion of the camera body; and for use with a photographic lens; said accessory comprising:

a first intermediary element mounted for fore-and-aft motion, relative to such lens-mounting port, and manually operable focal controls at the left side of the accessory for controlling said fore-and-aft motion;

at least one intermediary translational-motion element mounted for translational motion in a plane that is at least very generally parallel to such mounting-port plane;

at least one intermediary rotational-motion element mounted for rotation about an axis which lies in a plane that is at least very generally parallel to such mounting-port plane;

a frame which is supported relative to the camera body, and which supports at least some of said intermediary elements, and which includes at least one substantially linear member that extends alongside but substantially not beneath such lens when such lens is in use, said alongside extension being in a plane that is at least very generally parallel to such mounting-port plane;

whereby when the accessory is used with such first camera the substantially linear member during motion, by virtue of its nonextension beneath such lens in a plane at least very generally parallel to such mounting-port plane, does not interfere with such central lower mirror housing of such first camera;

said frame being sufficiently narrow, at least on its right side, to clear such mirror housing of such second camera, at least when said second intermediary element is disposed generally near its said central position;

said frame being vertically relieved on at least one side to clear such viewfinder on such third camera;

said frame being sufficiently narrow, at least on its right side, to clear such mirror housing of such fourth camera; and said vertical relief of said frame also clearing such viewfinder on such fourth camera;

whereby all of the intermediary elements operate substantially without interference with such first generally central lower mirror housing of such first camera, such mirror housing of such second camera, or such viewfinder of such third camera, or such mirror housing and viewfinder of such fourth camera, when the accessory is used with such first, second, third or fourth camera respectively;

a lens-board mount, supported from all of the intermediary elements, for mounting such photographic lens; and an adapter attached to one of said intermediary elements, said adapter being engageable with such lens-mounting port of such motion-picture camera;

whereby such lens, when in use, is disposed and oriented in a selectable manner relative to such film plane.

* * * * *